US011265137B2

(12) United States Patent
Fukui

(10) Patent No.: US 11,265,137 B2
(45) Date of Patent: Mar. 1, 2022

(54) BASE STATION, TERMINAL, WIRELESS COMMUNICATION SYSTEM, AND TRANSMISSION/RECEPTION METHOD

(71) Applicant: MITSUBISHI ELECTRIC CORPORATION, Tokyo (JP)

(72) Inventor: Noriyuki Fukui, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 229 days.

(21) Appl. No.: 16/326,645

(22) PCT Filed: Sep. 27, 2016

(86) PCT No.: PCT/JP2016/078465
§ 371 (c)(1),
(2) Date: Feb. 19, 2019

(87) PCT Pub. No.: WO2018/061088
PCT Pub. Date: Apr. 5, 2018

(65) Prior Publication Data
US 2020/0382265 A1 Dec. 3, 2020

(51) Int. Cl.
H04L 5/02 (2006.01)
H04B 7/06 (2006.01)
(Continued)

(52) U.S. Cl.
CPC ........... H04L 5/023 (2013.01); H04B 7/0617 (2013.01); H04B 7/0632 (2013.01);
(Continued)

(58) Field of Classification Search
CPC ......... H04L 5/023; H04L 1/0006; H04L 1/08; H04L 5/0023; H04L 5/0048; H04B 7/0617; H04B 7/0632; H04W 16/28
See application file for complete search history.

(56) References Cited

U.S. PATENT DOCUMENTS

2009/0129332 A1* 5/2009 Dayal .................... H04L 5/143
370/330
2013/0294317 A1* 11/2013 Malladi ............... H04W 72/005
370/312
(Continued)

FOREIGN PATENT DOCUMENTS

WO WO 2013/036021 A2 3/2013
WO WO 2015/080646 A1 6/2015

OTHER PUBLICATIONS

Extended European Search Report issued in corresponding European Application No. 16917641.9 dated Sep. 9, 2019.
(Continued)

Primary Examiner — Ayaz R Sheikh
Assistant Examiner — Tarell A Hampton
(74) Attorney, Agent, or Firm — Birch, Stewart, Kolasch & Birch, LLP

(57) ABSTRACT

A base station includes: a controller that performs control to transmit a plurality of signals that is common to each terminal to a terminal located in a coverage area of its own base station by transmitting the plurality of signals at the same timing while frequency multiplexing the plurality of signals on a frequency domain in an area where the signals can be transmitted simultaneously using a beam within the coverage area, and transmitting the plurality of signals a plurality of times while changing the area; and an antenna
(Continued)

that transmits the plurality of signals area by area while changing a direction of the beam under the control of the controller.

15 Claims, 17 Drawing Sheets

(51) Int. Cl.
*H04L 1/00* (2006.01)
*H04L 1/08* (2006.01)
*H04L 5/00* (2006.01)

(52) U.S. Cl.
CPC .............. *H04L 1/0006* (2013.01); *H04L 1/08* (2013.01); *H04L 5/0023* (2013.01); *H04L 5/0048* (2013.01)

(56) References Cited

U.S. PATENT DOCUMENTS

| | | | |
|---|---|---|---|
| 2016/0226640 A1 | 8/2016 | Seol et al. | |
| 2016/0277225 A1 | 9/2016 | Frenne et al. | |
| 2017/0012753 A1* | 1/2017 | Kim | H04W 56/002 |
| 2017/0353257 A1* | 12/2017 | Islam | H04L 27/2657 |
| 2018/0084593 A1* | 3/2018 | Chen | H04L 5/0048 |
| 2018/0167836 A1* | 6/2018 | Axmon | H04W 36/26 |
| 2018/0324678 A1* | 11/2018 | Chen | H04W 8/08 |
| 2019/0223094 A1* | 7/2019 | Ingale | H04W 68/005 |
| 2020/0296765 A1* | 9/2020 | Kim | H04W 74/0833 |

OTHER PUBLICATIONS

Huawei et al., "Access Mechanism for Beam Based Approach," 3GPP TSG RAN WG1 Meeting #86, Gothenburg, Sweden, Aug. 22-26, 2016, R1-166088.
ZTE Corporation et al., "Reference Signal Design for NR MIMO," 3GPP TSG RAN WG1 Meeting #86, Gothenburg, Sweden, Aug. 22-26, 2016, R1-166213.
LG Electronics, Discussion on DL Synchronization in NR, 3GPP TSG-RAN WG1#86 R1-166910, Aug. 13, 2016, Internet.
Nokia, Alcatel-Lucent Shanghai Bell, Verizon Wireless, Multi-Beam Common Control Plane Design, 3GPP TSG-RAN WG1#86 R1-167280, Aug. 12, 2016, Internet.
Office Action issued in corresponding Japanese Application No. 2018-541758 dated Jun. 25, 2019.
ZTE, Design Considerations for DL Sweeping Time Interval In NR, 3GPP TSG-RAN WG1#86 R1-166418, Aug. 13, 2016, Internet.
R1-164013, "Framework for beamformed access", Samsung, May 2016, 3GPP TSG RAN WG1 #85, total 4 pages.
R1-164014, "Discussion on RS for beamformed access", Samsung, May 2016, 3GPP TSG RAN WG1 #85, total 3 pages.
Indian Office Action dated Aug. 24, 2020 for Application No. 201947008842 with an English translation.
Office Action dated Jul. 26, 2021 in corresponding Chinese Application No. 201680089451.4 with English Machine Translation.
Indian Office Action dated Dec. 8, 2021 for Application No. 202048053574 with English Translation.

* cited by examiner

BASE STATION, TERMINAL, WIRELESS COMMUNICATION SYSTEM, AND TRANSMISSION/RECEPTION METHOD

FIELD

The present invention relates to a base station that performs wireless communication with a terminal using a beam, a terminal, a wireless communication system, and a transmission/reception method.

BACKGROUND

An initial connection operation of a terminal that connects to a base station to start wireless communication begins with the terminal searching the vicinity thereof and detecting a radio signal transmitted by the base station. According to a standard set by a standardization body called the 3rd Generation Partnership Project (3GPP), for example, the aforementioned radio signal is a signal periodically transmitted by the base station and detected by the terminal to detect the base station and synchronize with the frequency and time of the signal transmitted by the base station, where the signal has one of a plurality of signal patterns predetermined by the standard. The signal pattern of the radio signal also has a role of indicating a base station identification (ID) that identifies the base station. Thus, when detecting a plurality of radio signals, the terminal can identify base stations transmitting the corresponding radio signals. Note that the radio signal is called a synchronization signal. The synchronization signal will be hereinafter referred to as an SS in some cases.

Moreover, the base station periodically transmits a broadcast signal including a frequency bandwidth covered by the base station, a time period that the base station can receive a physical random access channel (PRACH) which is a random access signal transmitted first by the terminal at the time of requesting connection to the base station, a frequency band of the PRACH that the base station can receive, and information on a signal pattern that the base station can receive. The broadcast signal includes a physical broadcast channel (PBCH) and system information (SI), and the relative positional relationship of the frequency band and the time period between the broadcast signal and the synchronization signal is determined by the standard. The terminal can identify position information on the frequency band and the time period for another broadcast signal by looking at the content of the broadcast signal for which the positional relationship of the frequency band and the time period is determined. In the following description, the position of the frequency band and the position of the time period are simply referred to as the position of the frequency and the position of the time, respectively.

A terminal initiating the initial connection first performs an operation to detect a synchronization signal, receives a broadcast signal for which the position of the frequency and the position of the time can be identified from the synchronization signal detected, checks the content of the broadcast signal, and acquires information to transmit the PRACH. The terminal performing the initial connection can be located anywhere in the entire coverage area of the base station, so that the base station needs to transmit the synchronization signal and the broadcast signal to the entire coverage area. The base station also needs to be able to receive the PRACH transmitted by the terminal from anywhere in the coverage area.

The terminal performs an operation similar to the initial connection at the time of handover for switching the base station on the other end of the communication. That is, the terminal determining that the communication with a current base station has decreased in quality detects and receives the synchronization signal and the broadcast signal at the time of detecting a base station as a candidate for the switchover or at the time of actually switching the base station.

Each time the terminal completes connection and starts communication with a base station, the base station allocates frequency and time resources for communication to the terminal. During communication with the terminal, the base station requires communication quality information between the base station and the terminal to select a modulation scheme and an error correction coding rate corresponding to the quality of communication between the base station and the terminal. In the downlink directed from the base station to the terminal, the base station typically transmits a channel state indication-reference signal (CSI-RS) which is a signal having a prescribed pattern for quality measurement. The terminal measures the reception quality of the CSI-RS transmitted from the base station, and reports CSI as a result of measurement to the base station. In the uplink directed from the terminal to the base station, the terminal transmits a sounding reference signal (SRS) which is a signal having a prescribed pattern for quality measurement. The base station measures the reception quality of the SRS transmitted from the terminal. The terminal can be located anywhere in the entire coverage area of the base station, so that the base station needs to transmit the CSI-RS to the entire coverage area thereof. The base station also needs to be able to receive the CSI and SRS transmitted by the terminal from anywhere in the coverage area.

When data is to be transmitted in the uplink, the terminal requests the base station for the frequency and time resources according to a certain mechanism. A signal transmitted when the terminal requests for the resources is called a scheduling request (SR). The base station needs to be able to receive the SR transmitted by the terminal from anywhere in the coverage area.

Among the control signals described above, the signals SS, PRACH, PBCH, SI, CSI-RS, CSI, SRS, and SR are defined in the 3GPP long term evolution (LTE) standard and the like. The SS, PRACH, PBCH, CSI-RS, and SRS are channels or signals handled by the physical layer. The SI is handled by a layer called radio resource control (RRC), and is carried by a channel called a physical downlink shared channel (PDSCH) of the physical layer. The CSI indicates information on the downlink reception quality, and is carried by a physical uplink control channel (PUCCH) or a physical uplink shared channel (PUSCH) as a signal handled by the physical layer. The SR is handled by a layer called medium access control (MAC) and is carried by the PUCCH.

The base station cannot know the timing at which a terminal requests the initial connection, and thus needs to periodically transmit the SS, PBCH, and SI. Similarly, the base station needs to periodically set the timing to receive the PRACH. Regarding the CSI-RS, CSI, and SRS, the 3GPP standard includes both one that the transmission/reception timing is set periodically and one that the transmission/reception timing is set on a trigger-by-trigger basis to enable measurement immediately when needed. Moreover, the base station cannot know the timing at which data is generated on the terminal, and thus periodically sets the timing to receive the SR.

Now, the 3GPP has recently been working on the development of standards for the fifth generation mobile communication system. One technology under consideration by the 3GPP is a technology in which a base station transmits a signal by using a plurality of antennas to form a beam only in the direction of a terminal with which the base station communicates, that is, by beamforming, at the time the base station communicates with the terminal. The beamforming technology allows the base station to narrow the direction in which a radio signal is transmitted. As a result, the base station can prevent or reduce interference to another terminal located at another place.

Moreover, the base station transmitting the signal in a specific direction can concentrate transmission power more than when the signal is transmitted throughout the coverage area, thereby being able to increase the range of the signal.

The beamforming technology can also be applied to a case where the base station receives a signal from a terminal. That is, the base station orients a receiving antenna in the direction of signal reception to be able to prevent or reduce the influence of interference waves coming from a direction other than the direction of reception.

However, a single beam allows a signal to be transmitted only in a specific direction or a signal to be received only from a specific direction, whereby the base station needs a plurality of beam directions to cover the entire coverage area.

At the time of initial connection for initiating communication, a terminal first searches for a base station with which sufficient signal quality can be obtained for communication. Likewise, at the time of handover, a terminal searches for a neighboring base station, which is a base station in the neighborhood, other than a communicating base station being a base station with which the terminal is in communication.

In the case of typical handover in a wireless communication system not using beamforming, a terminal detecting deterioration in the signal quality with a communicating base station detects a synchronization signal and a broadcast signal transmitted by a neighboring base station and measures reception quality. The terminal reports a result of measurement of the reception quality to the current communicating base station together with a handover request. Upon receiving the report, the communicating base station chooses one of a neighboring base station with the best reception quality and a neighboring base stations with which the reception quality necessary for communication can be obtained, and makes a handover request to a neighboring base station chosen. If the neighboring base station having received the request can accept handover, the neighboring base station sends a response to that effect to the communicating base station. Upon receiving the response that handover can be accepted, the communicating base station transmits a handover execution command to the terminal together with information such as a base station ID of the neighboring base stations to be the handover destination. Upon receiving the handover execution command, the terminal transmits a PRACH as a communication request to the neighboring base station being the handover destination. On the other hand, the neighboring base station detecting the PRACH sends a response signal for the PRACH back to the terminal and starts communication.

Meanwhile, as for a wireless communication system using beamforming, Non Patent Literature 1 discloses a technology in which a base station covers the entire coverage area using a beam. The base station cannot cover the entire coverage area using just the number of beams that can be generated at once, and thus uses a plurality of timings and changes the direction of the beams at each timing, that is, performs beam sweeping, to cover the entire coverage area. Non Patent Literature 1 further discloses that synchronization signals, system information, random access channel, and the like are the signals to be transmitted and received between the base station and a terminal throughout the coverage area, and that these signals are transmitted and received by beamforming.

Non Patent Literature 2 defines a beam specific reference signal (BRS) for the purpose of appropriately selecting a beam to be used when a base station and a terminal communicate with each other. The base station periodically transmits the BRS, and the terminal returns an index of a beam determined to be the best as a result of measurement to the base station.

CITATION LIST

Non Patent Literature

Non Patent Literature 1: 3GPP TSG RAN WG1 #85 "R1-164013", 2016
Non Patent Literature 2: 3GPP TSG RAN WG1 #85 "R1-164014", 2016

SUMMARY

Technical Problem

However, the above conventional technology includes no description about the relationship among the transmission timings of the SS, PBCH, SI, and BRS being downlink signals from the base station. These signals require different transmission periods, so that the base station possibly sets an independent transmission timing for each signal and transmits each signal using beamforming. In this case, the base station uses different times to transmit the SS, PBCH, SI, and BRS, thereby causing a problem that the time remaining is decreased, that is, the time resources for transmitting data in the downlink are diminished. Regarding the CSI-RS as well, the relationship of the transmission timing with each signal is not disclosed. When the base station sets the transmission timing independent of each signal for the CSI-RS, the time resources for transmitting data are further diminished.

Moreover, the above conventional technology includes a description about the PRACH which is an uplink signal from a terminal but no description about the CSI, SRS, and SR being other uplink signals. When the terminal sets independent transmission timings for these signals as well, the time resources for transmitting data in the uplink are diminished. Moreover, the PRACH is considered to use a small amount of the frequency resources rather than the entire frequency resources in the system frequency band. This causes a problem of poor efficiency of the frame format carrying only the PRACH on the entire frequency band.

Moreover, the frame format used for the fifth generation mobile communication system is currently under consideration by the 3GPP, which has agreed that future studies will proceed on the basis of this frame format. However, the frame format used to transmit and receive signals common to all terminals such as the SS and PBCH has not yet been considered.

The present invention has been made in view of the above, and an object of the present invention is to provide a base station that can prevent or reduce a decrease in frequency and time resources for data transmission and reception when transmitting and receiving a plurality of control signals to/from a terminal.

Solution to Problem

In order to solve the above-described problems and achieve the object, a base station of the present invention includes: a controller to perform control to transmit a plurality of signals that is common to each terminal to a terminal located in a coverage area of its own base station by transmitting the plurality of signals at the same timing while frequency multiplexing the plurality of signals on a frequency domain in an area where the signals can be transmitted simultaneously using a beam within the coverage area, and transmitting the plurality of signals a plurality of times while changing the area; and an antenna to transmit the plurality of signals area by area while changing a direction of the beam under the control of the controller.

Advantageous Effects of Invention

The base station according to the present invention can prevent or reduce a decrease in the frequency and time resources for data transmission and reception when transmitting and receiving the plurality of control signals to/from the terminal.

DESCRIPTION OF EMBODIMENTS

A base station, a terminal, a wireless communication system, and a transmission/reception method according to an embodiment of the present invention will now be described in detail with reference to the drawings. Note that the present invention is not limited to the embodiment.

First Embodiment

Figure 1:
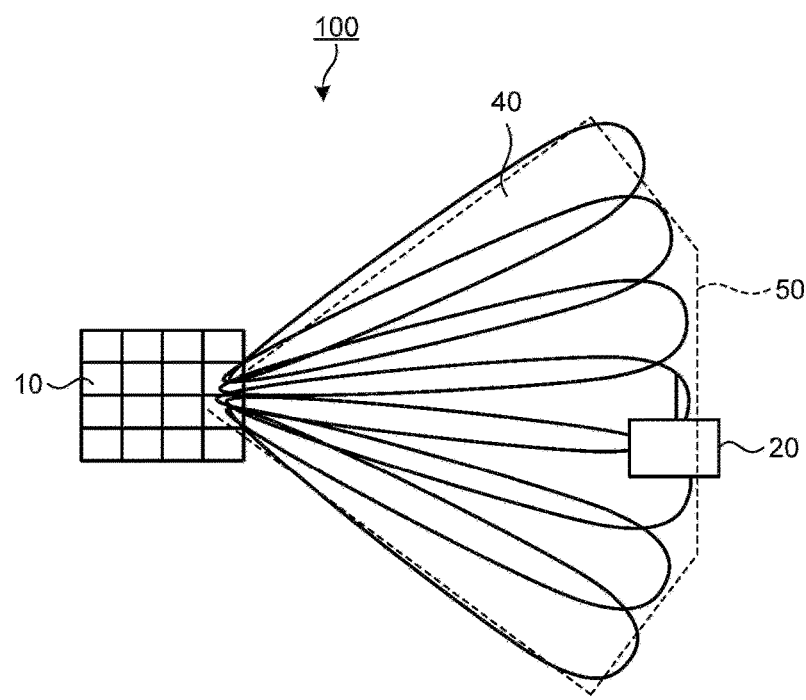
FIG. 1 is a diagram illustrating an example of the configuration of a wireless communication system according to a first embodiment.

FIG. 1 is a diagram illustrating an example of the configuration of a wireless communication system 100 according to a first embodiment of the present invention. The wireless communication system 100 includes a base station 10 and a terminal 20. The base station 10 communicates with the terminal 20 using a beam 40. Specifically, the base station 10 forms the beam 40 by beamforming and communicates with the terminal 20 within a coverage area 50 of the base station 10. The base station 10 can identify the position of the terminal 20 during communication therewith, and thus directs the beam 40 only in the direction of the terminal 20. On the other hand, the base station 10 cannot identify the position of the terminal 20 before initiating communication therewith, and thus changes the direction of the beam 40 in turn, that is, performs beam sweeping, to transmit and receive a signal to/from the terminal 20 that is located throughout the coverage area 50 and not yet in communication. The base station 10 also performs beam sweeping to receive CSI, SRS, and SR from all the terminals 20 located throughout the coverage area 50 even during communication with the terminals 20. The terminal 20 can transmit and receive a signal to/from the base station 10 when the beam from the base station 10 is directed toward the terminal 20. Note that although FIG. 1 illustrates an example including one base station 10 and one terminal 20, the wireless communication system 100 can include a plurality of the base stations 10. Moreover, the base station 10 can communicate with a plurality of the terminals 20 located within the coverage area 50. Note that in a case where the subject is the base station 10 or each configuration included in the base station 10 as described later, the base station 10 may be referred to as its own base station 10 in the description. Likewise, in a case where the subject is the terminal 20 or each configuration included in the terminal 20 as described later, the terminal 20 may be referred to as its own terminal 20 in the description.

In the first embodiment, the base station 10 transmits SS, PBCH, SI, and BRS at the same timing and synchronizes the timing of beam sweeping therewith. The terminal 20 receives the SS, PBCH, SI, and BRS at the same timing. Moreover, the terminal 20 transmits PRACH, CSI, and SR at the same timing. The base station 10 receives the PRACH, CSI, and SR at the same timing and synchronizes the timing of beam sweeping therewith. As a result, the base station 10 can reduce a decrease in the time resources at the time of transmitting data, that is, increase the time resources at the time of transmitting data, as compared with a case where the SS, PBCH, SI, and BRS are transmitted individually. The terminal 20 can reduce a decrease in the time resources at the time of transmitting data, that is, increase the time resources at the time of transmitting data, as compared with a case where the PRACH, CSI, and SR are transmitted individually.

Figure 2:
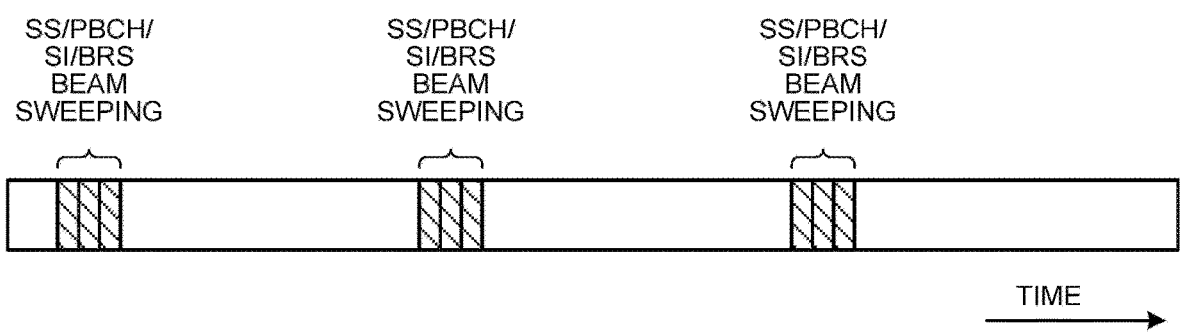
FIG. 2 is a diagram illustrating an example of transmission timings of signals at a base station according to the first embodiment.

FIG. 2 is a diagram illustrating an example of transmission timings of the signals at the base station 10 according to the first embodiment. FIG. 2 is also a diagram illustrating reception timings of the signals at the terminal 20. The horizontal axis in FIG. 2 represents time. FIG. 2 illustrates an example in which the base station 10 transmits the SS, PBCH, SI, and BRS at the same timing.

Figure 3:
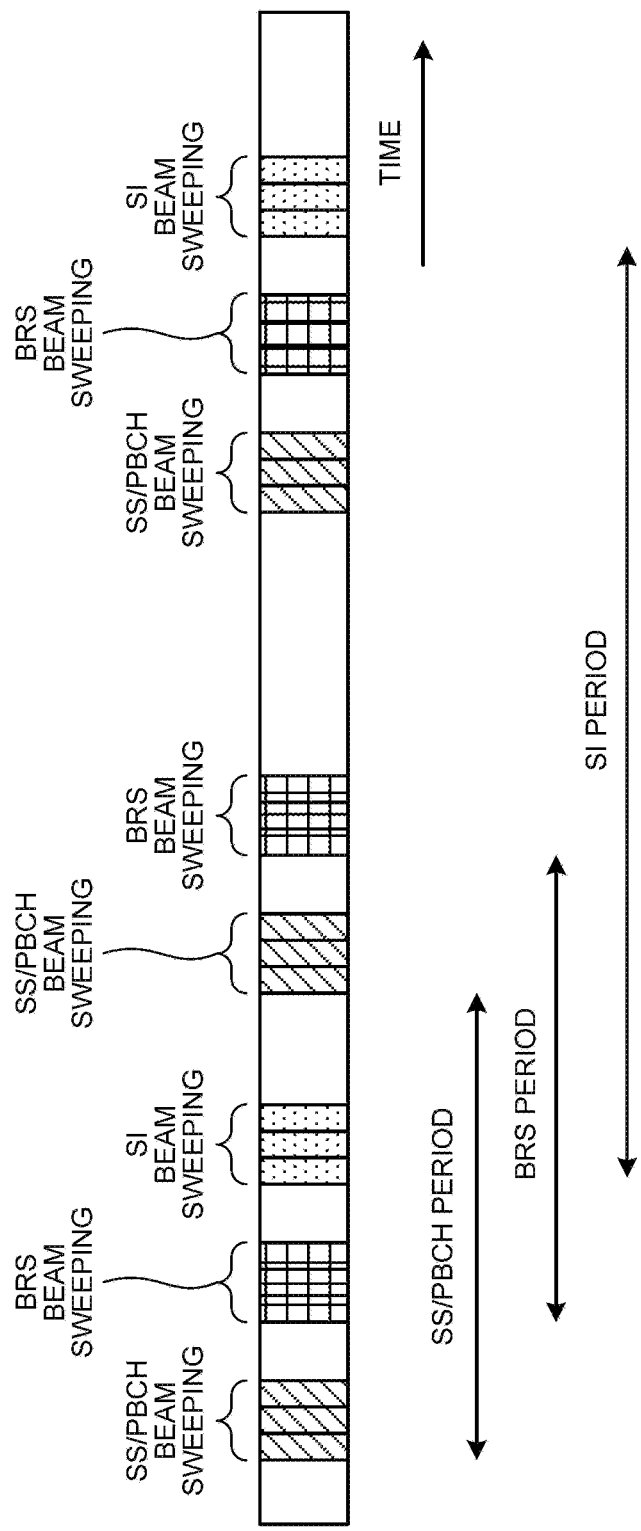
FIG. 3 is a diagram illustrating an example when the base station transmits signals at different timings according to the first embodiment.

Here, a case where the base station 10 transmits the signals of SS, PBCH, SI, and BRS at different timings will be described. FIG. 3 is a diagram illustrating an example when the base station 10 transmits the signals at different timings according to the first embodiment. FIG. 3 is also a diagram illustrating reception timings of the signals at the terminal 20. FIG. 3 illustrates an example in which the base station 10 transmits the SS, PBCH, SI, and BRS at different timings. Comparing FIGS. 2 and 3, FIG. 2 has more blank space, that is, resources remaining, in the time domain. The base station 10 can use the blank space, that is, the increased resources remaining, in the time domain for transmission/reception of data to/from the terminal 20.

Figure 4:
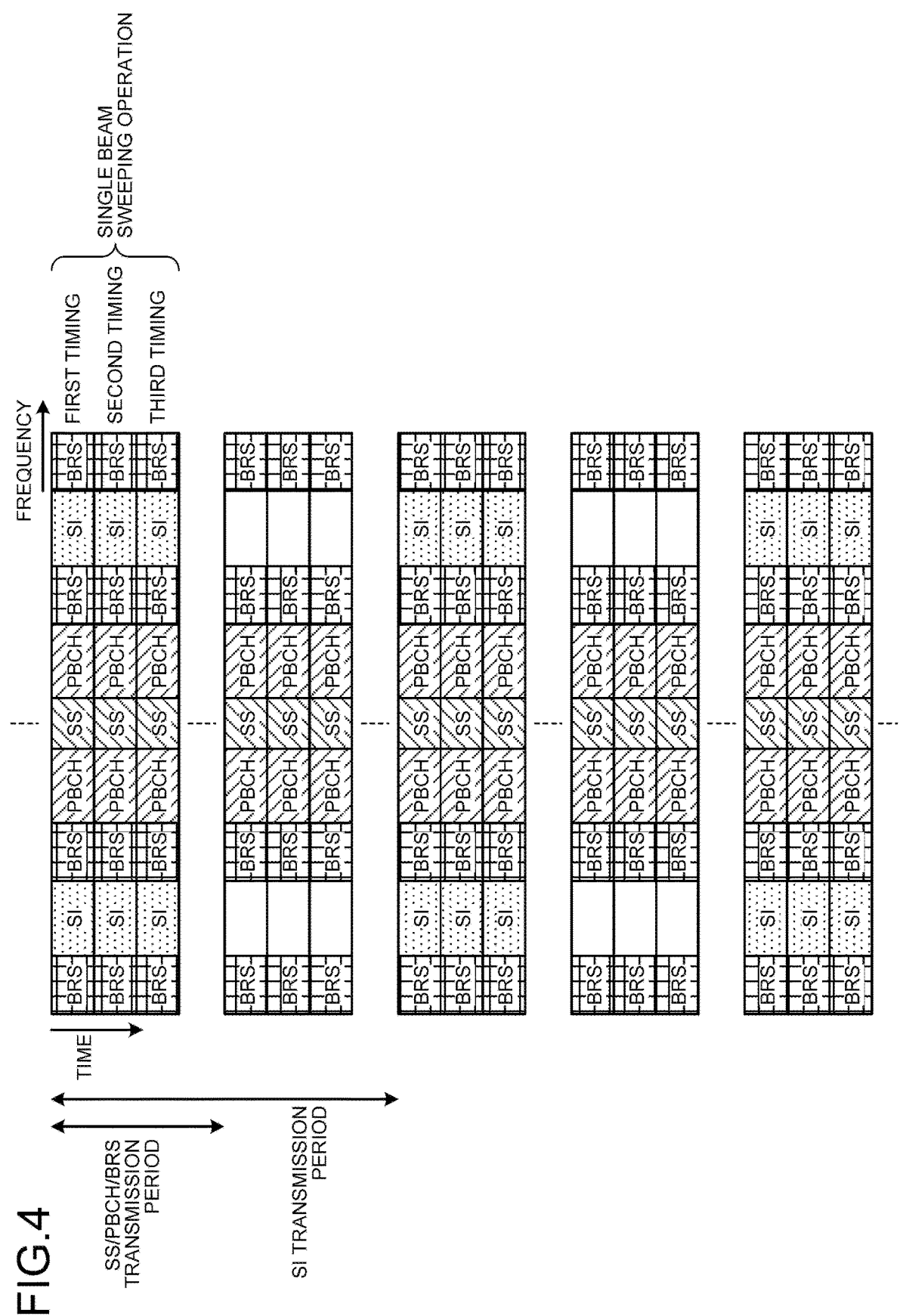
FIG. 4 is a diagram illustrating an example when the base station transmits signals by multiplexing the signals in a frequency domain, according to the first embodiment.

FIG. 4 is a diagram illustrating an example when the base station 10 transmits the signals by multiplexing the signals in the frequency domain, according to the first embodiment. In FIG. 4, the horizontal axis represents frequency, and the vertical axis represents time. Note that the frequency multiplexing illustrated in FIG. 4 is only an example, and thus the signals may be arranged in any way on the frequency domain. FIG. 4 is an example of a frame format used when a plurality of signals, specifically, the signals of SS, PBCH, SI, and BRS, is transmitted from the base station 10 to the terminal 20. In FIG. 4, a single beam sweeping operation of the base station 10 includes three timings. The base station 10 changes the direction of the beam at each of the first, second, and third timings. Note that the first, second, and third timings described as timings for convenience of explanation do not indicate instantaneous time, but each have a specified time width as illustrated in FIG. 4.

Figure 5:
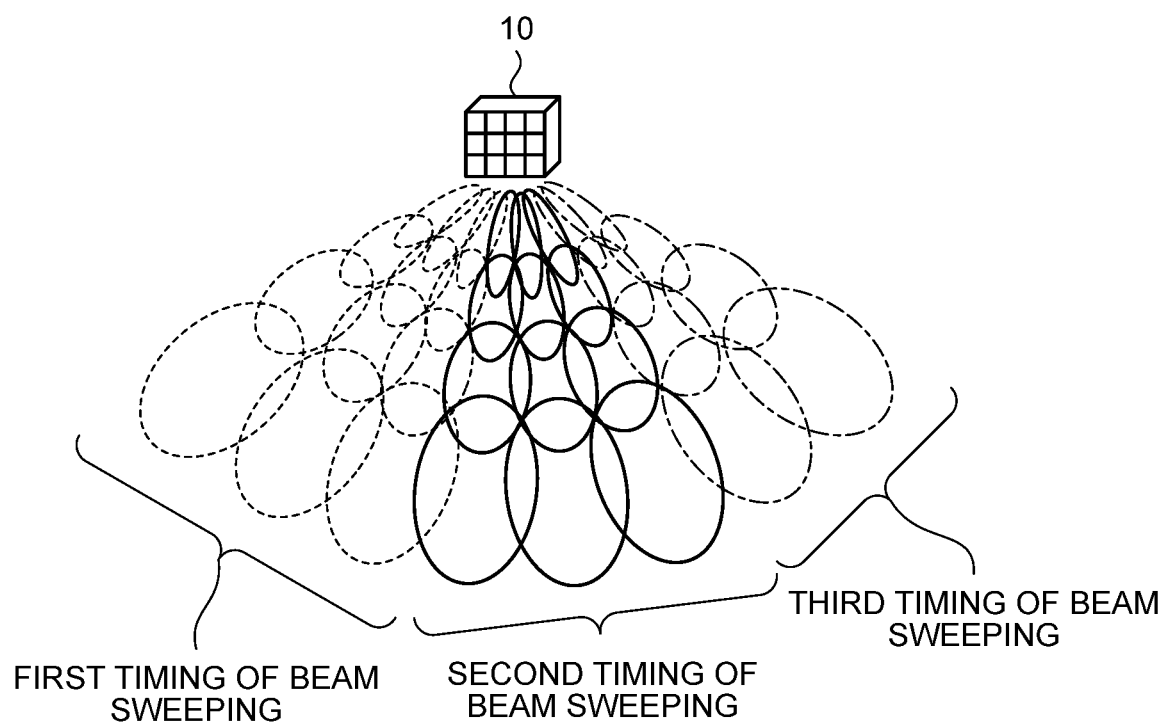
FIG. 5 is a diagram illustrating an example of beam sweeping performed by the base station according to the first embodiment.

FIG. 5 is a diagram illustrating an example of beam sweeping performed by the base station 10 according to the first embodiment. The base station 10 can transmit signals to the entire coverage area 50 by performing a single beam sweeping operation, that is, by performing beamforming in different directions corresponding to three areas to transmit signals, for the coverage area 50 illustrated in FIG. 1. The base station 10 thus transmits necessary signals to the entire coverage area 50 in a single beam sweeping operation by transmitting the SS, PBCH, SI, and BRS at the same timing. This allows the base station 10 to secure more time resources for data transmission/reception than when the signals are transmitted individually. Note that although FIGS. 4 and 5 illustrate the example in which the base station 10 radiates the beams to the entire coverage area 50 at three timings, the same idea as above can be applied to a case where the beams are radiated a different number of times. Although not illustrated in FIG. 4, where "L" represents the number of beams that can be generated at once by the base station 10, the base station 10 directs the beams in a maximum of L directions at one timing and transmits the SS, PBCH, SI, and BRS using the frame format illustrated in FIG. 4. At this time, the base station 10 can change the direction of a target to which the SS, PBCH, SI, and BRS are transmitted for each beam. Note that "L" is an integer of 1 or more.

Note that in the example of FIG. 4, the SI is not included in the signals transmitted by the base station 10 once every two beam sweeping operations thereof. This illustrates an example in which the transmission period of the SI is set longer than the transmission periods of the SS, PBCH, and BRS. The transmission period of the SI may be longer than the transmission periods of other signals such as the PBCH in general, so that the case of FIG. 4 is feasible. However, if it is determined in the future that the transmission period of the SI needs to be decreased, the base station 10 can transmit the SI with a short transmission period equal to the transmission periods of the SS, PBCH, and BRS. Conversely, the transmission period of another signal can be longer. In such a case as well, the base station 10 can synchronize the beam sweeping operation by just reducing transmission of a target signal which is transmitted with a longer transmission period, and transmitting the remaining signals among the SS, PBCH, SI, and BRS at the same timing. Moreover, in FIG. 4, the base station 10 reduces transmission of the SI requiring a long transmission period as compared to transmission of the SS, PBCH, and BRS, but may transmit the SI without reducing transmission thereof. This brings an advantage that the terminal 20 can receive the SI earlier.

Figure 6:
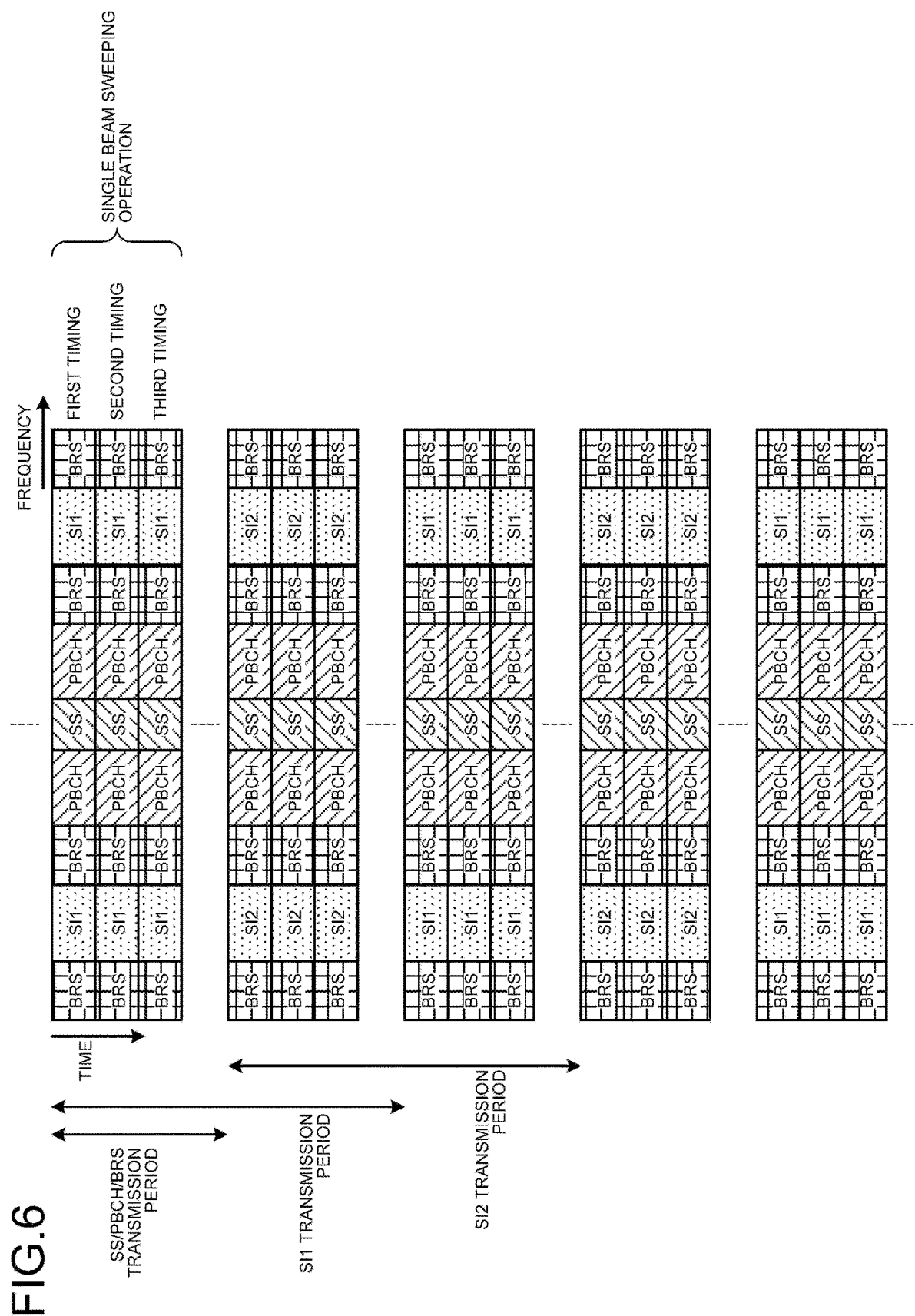
FIG. 6 is a diagram illustrating another example when the base station transmits signals by multiplexing the signals in the frequency domain, according to the first embodiment.

FIG. 6 is a diagram illustrating another example when the base station 10 transmits the signals by multiplexing the signals in the frequency domain, according to the first embodiment. FIG. 6 is another example of the frame format used when a plurality of signals, specifically, the signals of SS, PBCH, SI, and BRS, is transmitted from the base station 10 to the terminal 20. FIG. 6 illustrates an example in which the SI requires a long transmission period and includes SI1 and SI2 as two types of the SI. In the case of a plurality of SIs as in the example illustrated, the base station 10 can time multiplex the SIs while using the same frequency position. As a result, the base station 10 can avoid unnecessary resource consumption as compared with a case where the SI1 and SI2 are transmitted at the same timing by frequency multiplexing using a different frequency resource for each SI.

Note that in a case where the CSI-RS also needs to be transmitted periodically, the base station 10 can similarly transmit the CSI-RS in addition to the SS, PBCH, SI, and BRS by frequency multiplexing at the same timing of the beam sweeping operation as the other signals. Moreover, the base station 10 and the terminal 20 can use one common signal as the CSI-RS and BRS for the two purposes of grasping the position of the terminal 20 to select and update a beam suitable for communication, and performing quality measurement to select the modulation scheme and error correction coding rate. Note that the operation in which the base station 10 performs frequency multiplexing of the SS, PBCH, SI, and BRS to simultaneously transmit the signals at the same timing has been described up to this point, which is feasible when a sufficient frequency band can be secured. When a sufficient frequency band cannot be secured, the base station 10 may perform frequency multiplexing of the SS, PBCH, and BRS and transmit the SI at another timing.

Figure 7:
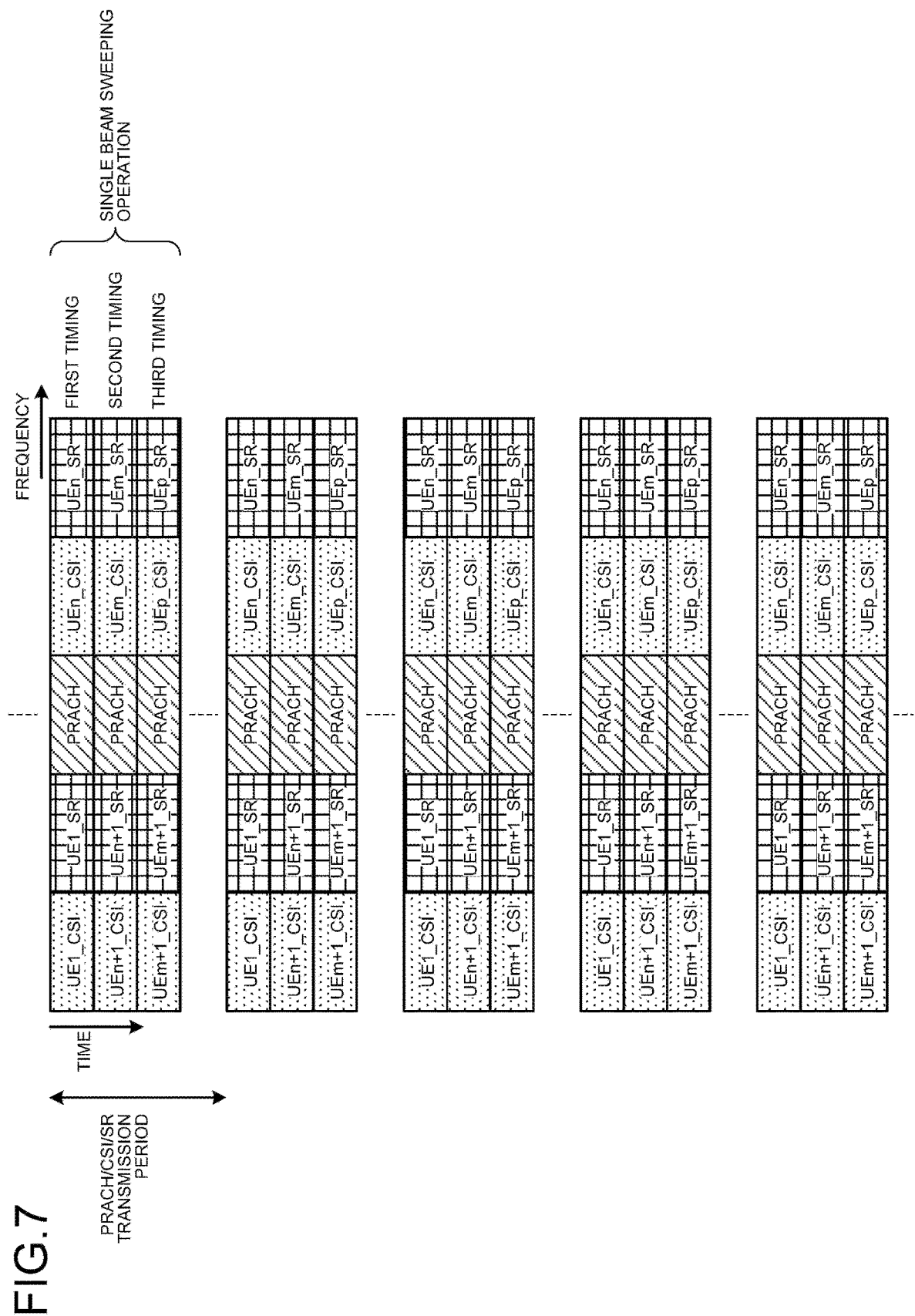
FIG. 7 is a diagram illustrating an example when the base station receives signals transmitted from a terminal, according to the first embodiment.

Next, a case where the base station 10 receives the signals of PRACH, CSI, and SR transmitted from the terminal 20 will be described. FIG. 7 is a diagram illustrating an example when the base station 10 receives the signals transmitted from the terminal 20, according to the first embodiment. The figure illustrates how the terminal 20 transmits the PRACH, CSI, and SR at the same timing while frequency multiplexing the signals. The base station 10 receives the frequency-multiplexed signal of PRACH, CSI, and SR at the same reception timing. FIG. 7 is an example of a frame format used when a plurality of signals, specifically, the signals of PRACH, CSI, and SR, is transmitted from the terminal 20 to the base station 10.

Note that the frequency multiplexing illustrated in FIG. 7 is only an example, and thus the signals may be arranged in any way on the frequency domain. In FIG. 7, a single beam sweeping operation of the base station 10 includes three timings. The base station 10 changes the direction of the beam at each of the first, second, and third timings. The base station 10 receives both the CSI and SR from a plurality of the terminals 20 that is in communication with the base station 10. Thus, when allocating frequency and time resources to the terminals, the base station 10 allocates the frequency resource as illustrated in FIG. 7 to each terminal 20 to be able to receive the frequency-multiplexed signal.

The terminal 20 transmits the PRACH, CSI, and SR at the same timing while the base station 10 receives the PRACH, CSI, and SR at the same timing, so that the base station 10 can receive necessary signals from the entire coverage area 50 in a single beam sweeping operation and secure more time resources for data transmission/reception than when receiving each signal individually. Note that although the CSI and SR are frequency-multiplexed only for two terminals at one transmission/reception timing for convenience of illustration of FIG. 7, in practice, the CSI and SR for as many terminals 20 as possible can be frequency-multiplexed on the frequency domain. Moreover, although FIG. 7 illustrates the example in which the base station 10 radiates the beams to the entire coverage area 50 at three reception timings, the same idea as above can be applied to a case where the beams are radiated a different number of times. Furthermore, although not illustrated in FIG. 7, where "L" represents the number of beams that can be generated at once by the base station 10, the base station 10 directs the beams in a maximum of L directions at one reception timing and receives the PRACH, CSI, and SR using the frame format illustrated in FIG. 7. At this time, the base station 10 receives the CSI and SR from a different target terminal 20 for each beam.

Note that the terminal 20 possibly transmits the CSI and SR with a longer transmission period than the transmission period of the PRACH. In such a case, the terminal 20 can synchronize the beam sweeping operation by just reducing transmission of the signals of CSI and SR to be transmitted with a longer transmission period, and transmitting the remaining signal of PRACH at the same timing.

Figure 8:
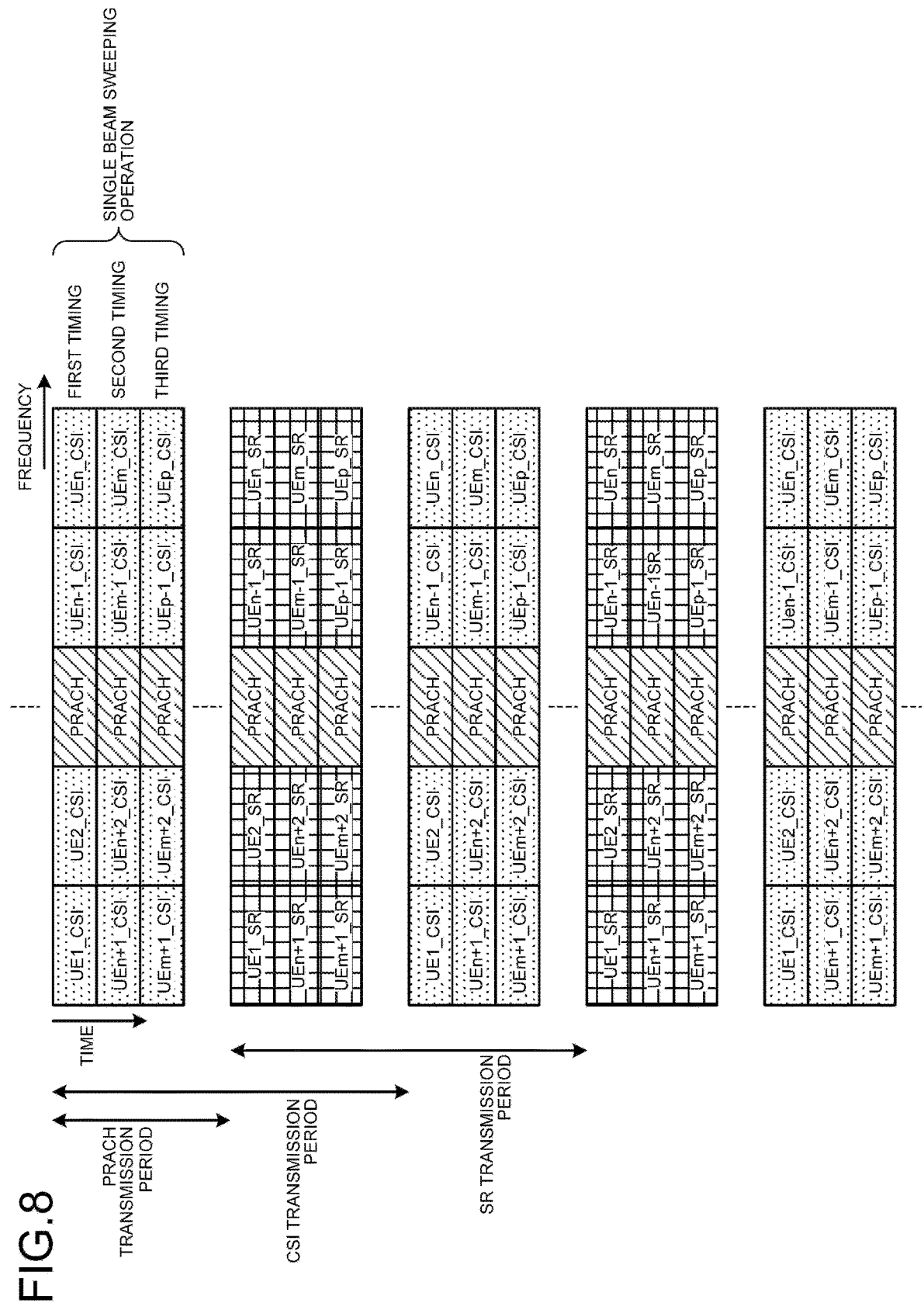
FIG. 8 is a diagram illustrating another example when the base station receives the signals transmitted from the terminal, according to the first embodiment.

FIG. 8 is a diagram illustrating another example when the base station 10 receives the signals transmitted from the terminal 20, according to the first embodiment. FIG. 8 is another example of the frame format used when a plurality of signals, specifically, the signals of PRACH, CSI, and SR, is transmitted from the terminal 20 to the base station 10. FIG. 8 illustrates a method of time multiplexing the CSI and SR using the same frequency position for the same terminal 20 when the transmission period of the CSI and SR is longer than the transmission period of the PRACH. In this case, more terminals 20 can be subjected to frequency multiplexing at the same timing. For example, while two terminals are subjected to frequency multiplexing in FIG. 7, four terminals are subjected to frequency multiplexing in FIG. 8.

Note that in a case where the SRS also needs to be transmitted periodically, the base station 10 can similarly transmit the SRS in addition to the PRACH, CSI, and SR by frequency multiplexing at the same timing of the beam sweeping operation as the other signals.

Next, the configuration of each device in the wireless communication system 100 will be described.

Figure 9:
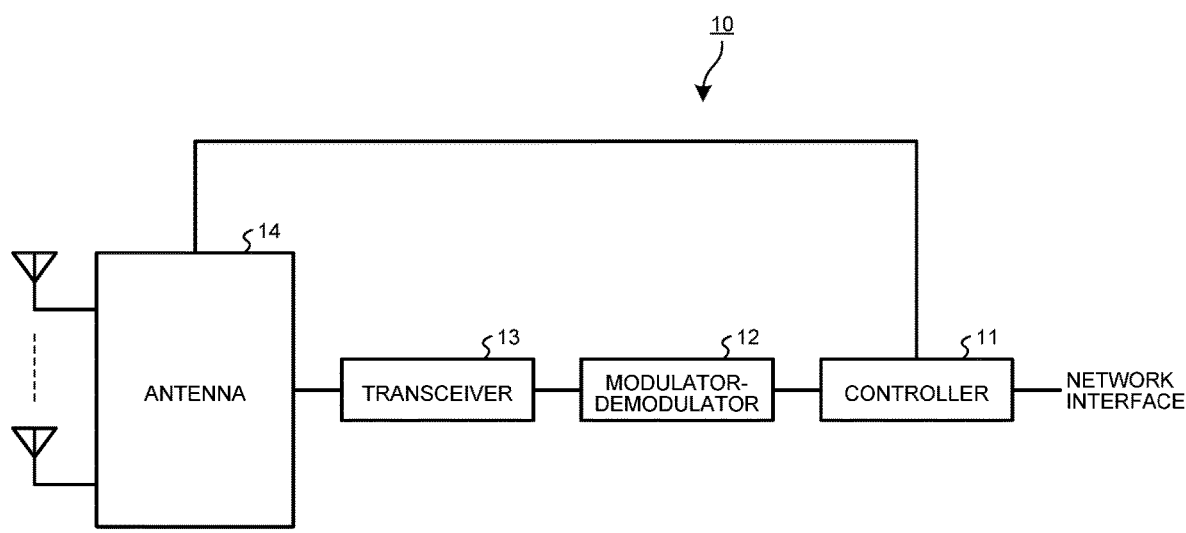
FIG. 9 is a block diagram illustrating an example of the configuration of the base station according to the first embodiment.

FIG. 9 is a block diagram illustrating an example of the configuration of the base station 10 according to the first embodiment. The base station 10 includes a controller 11, a modulator-demodulator 12, a transceiver 13, and an antenna 14. Note that although the base station 10 appears to include a plurality of antenna elements in addition to the antenna 14 in FIG. 9, the antenna 14 includes the plurality of antenna elements.

During communication with the terminal 20, the controller 11 receives data for each terminal 20 arriving from a network to which the base station 10 is connected via a network interface. The controller 11 manages the timing of transmitting data to each terminal 20, or the frequency and time resources used for transmission.

The controller 11 also manages the timing of receiving data from the terminal 20, or the frequency and time resources used for reception. The controller 11 further manages the transmission timing of the SS, PBCH, SI, BRS, and CSI-RS, the reception timing of the PRACH, CSI, SR, and SRS, and the frequency resources of these signals. When receiving signals such as the CSI and SR from a plurality of the terminals 20 in the frame format illustrated in FIGS. 7 and 8, the controller 11 allocates the frequency and time resources to each of the terminals 20 such that the frequency and time resources do not overlap with the frequency and time resources for the other terminals 20.

At the transmission timing of the SS, PBCH, SI, BRS, and CSI-RS, the controller 11 notifies the modulator-demodulator 12 of the signals together with information on the frequency resources. When determining to transmit data to a specific terminal 20, the controller 11 passes a signal of the data to be transmitted to the modulator-demodulator 12. In either case, the controller 11 instructs the antenna 14 about the direction of the beam. The direction of the beam is the direction indicated by any of the first, second, and third timings in beam sweeping illustrated in FIG. 5 and the like.

The modulator-demodulator 12 modulates the signals received, and passes modulated signals to the transceiver 13.

The transceiver 13 performs digital-to-analog conversion on the modulated signals and then up-converts the analog signals to radio frequency. The transceiver 13 passes the signals converted to the antenna 14.

The antenna 14 transmits the signals converted by the transceiver 13 to the terminal 20. At this time, under the control of the controller 11, the antenna 14 transmits the signals by directing the beam in the direction of the terminal 20 to which the signals are to be transmitted.

At the reception timing of the PRACH, CSI, SR, and SRS or when the controller 11 determines to receive data from a specific terminal 20, the antenna 14 receives the signals by directing the beam in the reception direction under the control of the controller 11. The antenna 14 passes the signals received to the transceiver 13.

The transceiver 13 down-converts the frequency of the signals received by the antenna 14, and then performs analog-to-digital conversion on the down-converted signals. The transceiver 13 passes the signals converted into digital signals to the modulator-demodulator 12.

The modulator-demodulator 12 demodulates the signals received, and passes demodulated signals or data to the controller 11.

The controller 11 sends the received data to the network via the network interface. When the received signal is the PRACH, the controller 11 performs processing of returning a response to the PRACH to the terminal 20. When the received signal is the CSI, the controller 11 accumulates information indicated by the CSI for use in selecting the modulation scheme and error correction coding rate at the time of transmitting data to a target terminal 20 the next time. When the received signal is the SR, the controller 11 performs processing of allocating resources for transmission/reception of uplink data to the target terminal 20. When the received signal is the SRS, the controller 11 accumulates a result of measurement indicated by the SRS for use in selecting the modulation scheme and error correction coding rate at the time of the processing of allocating resources for transmission/reception of uplink data to the target terminal 20.

When transmitting a plurality of signals common to each terminal to the terminal 20 located within the coverage area 50 of its own base station 10, the controller 11 performs control to transmit the plurality of signals to the terminal 20 located within the coverage area 50 at the same timing while frequency multiplexing the plurality of signals on the frequency domain in the area where the signals can be transmitted simultaneously using the beams 40 within the coverage area 50, and transmit the plurality of signals a plurality of times while changing the area. The antenna 14 changes the direction of the beams 40 under the control of the controller 11, and transmits the plurality of signals area by area.

When the transmission period of one or more first signals is longer than the transmission period of a second signal other than the first signal among the plurality of signals, the controller 11 performs control to reduce transmission of the first signal while allowing the first signal to be transmitted at the same timing as the second signal. In the above example, the first signal corresponds to the SI, and the second signal corresponds to the SS, PBCH, BRS, and the like.

When the transmission period of two or more third signals is longer than the transmission period of a fourth signal other than the third signals among the plurality of signals, the controller 11 performs control to allocate the same frequency position as the transmission resource of its own base station 10 and the reception resource of the terminal 20 to the two or more third signals, and time multiplex the two or more third signals for transmission. In the above example, the third signals correspond to the SI1 and SI2, and the fourth signal corresponds to the SS, PBCH, BRS, and the like.

When receiving a plurality of signals from the terminal 20 located within the coverage area 50 of its own base station 10, the controller 11 performs control to receive the plurality of signals from the terminal 20 located within the coverage area 50 at the same timing while frequency multiplexing the plurality of signals on the frequency domain in the area where the signals can be received simultaneously using the beams 40 within the coverage area 50, and receive the plurality of signals a plurality of times while changing the area. The antenna 14 changes the direction of the beams 40 under the control of the controller 11, and receives the plurality of signals area by area.

When the transmission/reception period of one or more first signals is longer than the transmission/reception period of a second signal other than the first signals among the plurality of signals, the controller 11 performs control to cause the terminal 20 to reduce transmission of the first signals while allowing the terminal 20 to transmit the first signals at the same timing as the second signal. In the above example, the first signals correspond to the CSI and SR, and the second signal corresponds to the PRACH.

When the transmission/reception period of two or more third signals is longer than the transmission/reception period of a fourth signal other than the second signals among the plurality of signals, the controller 11 performs control to allocate the same frequency position as the transmission resource of the terminal 20 and the reception resource of its own base station 10 to the two or more third signals, and cause the terminal 20 to time multiplex the two or more third signals for transmission. In the above example, the third signals correspond to the CSI and SR, and the fourth signal corresponds to the PRACH.

Figure 10:
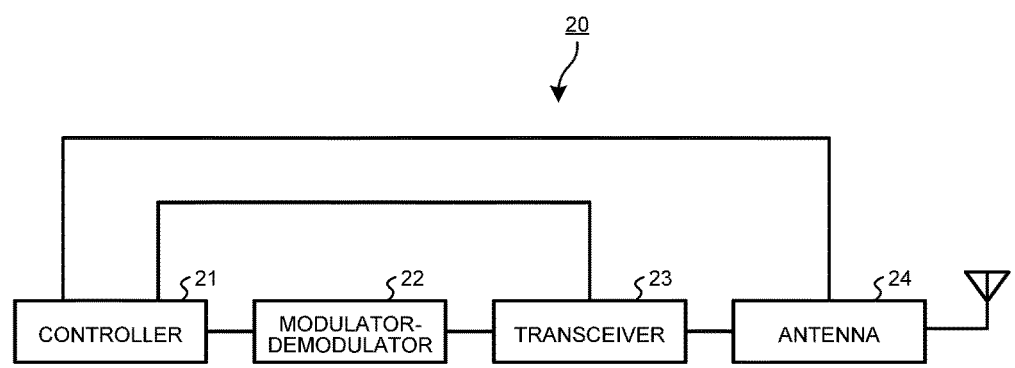
FIG. 10 is a block diagram illustrating an example of the configuration of the terminal according to the first embodiment.

FIG. 10 is a block diagram illustrating an example of the configuration of the terminal 20 according to the first embodiment. The terminal 20 includes a controller 21, a modulator-demodulator 22, a transceiver 23, and an antenna 24. Note that although the terminal 20 appears to include an antenna element in addition to the antenna 24 in FIG. 10, the antenna 24 includes the antenna element.

At the time of initial connection or handover, the controller 21 instructs each of the modulator-demodulator 22, the transceiver 23, and the antenna 24 to detect the signal pattern of the synchronization signal and measure the signal strength thereof. The controller 21 further gives an instruction to receive the PBCH and SI when detecting the synchronization signal. Moreover, at the reception timing of the BRS during communication with the base station 10, the controller 21 instructs each of the modulator-demodulator 22, the transceiver 23, and the antenna 24 to receive and measure the BRS. At the timing of possibly receiving data other than the BRS, the controller 21 instructs the modulator-demodulator 22, the transceiver 23, and the antenna 24 to be ready to receive and demodulate signals addressed to its own terminal 20 at any time.

The antenna 24 passes signals received to the transceiver 23.

The transceiver 23 down-converts the frequency of the signals received by the antenna 24, and then performs analog-to-digital conversion on the down-converted signals.

The transceiver 23 passes the signals converted into digital signals to the modulator-demodulator 22.

The modulator-demodulator 22 demodulates the signals received, and passes demodulated signals or data to the controller 21.

The controller 21 performs processing corresponding to the data received on the data by executing software corresponding to the data, for example. When the signal received is the synchronization signal, the controller 21 selects a base station candidate for the initial connection or handover on the basis of a result of measurement of the signal strength. When the signals received are the PBCH and SI, the controller 21 acquires information for transmitting the PRACH. When the signal received is the BRS, the controller 21 determines a beam candidate suitable for communication within the base station 10 that is in communication, on the basis of a result of measurement indicated by the BRS.

As uplink processing, the controller 21 detects data generated in its own terminal 20 during communication with the base station 10, and passes the detected data to the modulator-demodulator 22 according to the frequency and time resources allocated by the base station 10. Moreover, at the timing of transmitting the PRACH, CSI, SR, and SRS, the controller 21 passes signals corresponding to these signals to the modulator-demodulator 22.

The modulator-demodulator 22 modulates the data or signals received, and passes modulated signals to the transceiver 23.

The transceiver 23 performs digital-to-analog conversion on the modulated signals received, and then up-converts the analog signals to radio frequency. The transceiver 23 passes the signals converted to the antenna 24.

The antenna 24 transmits the signals converted by the transceiver 23 to the base station 10.

As described above, the controller 21 of the terminal 20 performs control to receive a plurality of signals at the same timing by receiving a signal in which the plurality of signals is frequency-multiplexed on the frequency domain from the base station 10.

The controller 21 also performs control to transmit a plurality of signals to the base station 10 at the same timing while frequency multiplexing the plurality of signals on the frequency domain.

Figure 11:
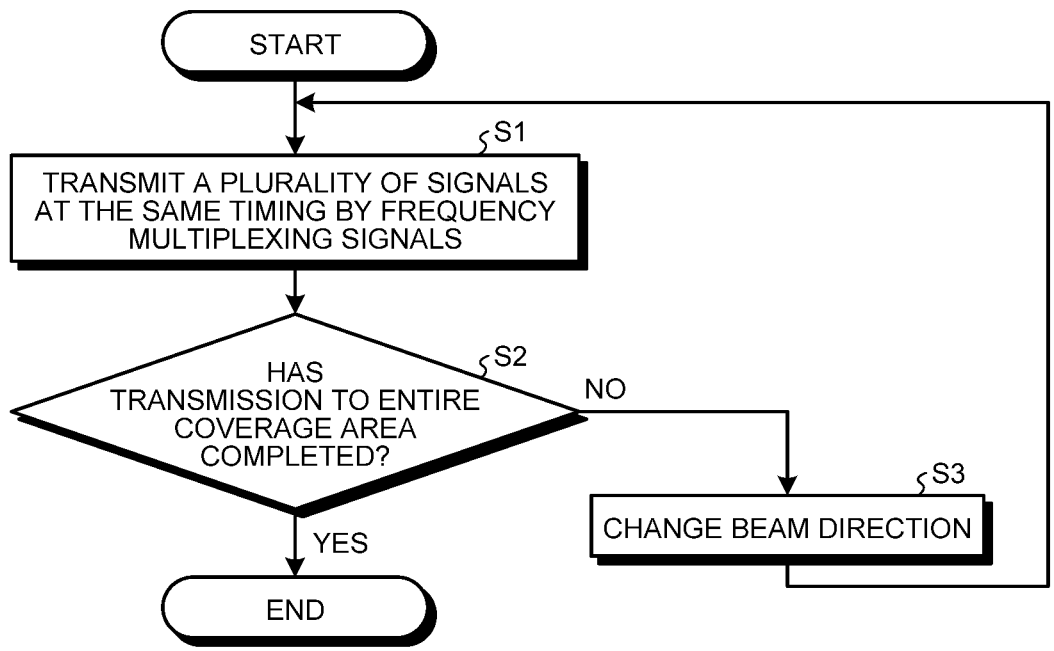
FIG. 11 is a flowchart illustrating processing in which the base station transmits a signal to the terminal according to the first embodiment.

Next, the operation of the base station 10 will be described with reference to a flowchart. FIG. 11 is a flowchart illustrating processing in which the base station 10 transmits signals to the terminal 20 according to the first embodiment. Under the control of the controller 11, the base station 10 performs frequency multiplexing on the frequency domain of a plurality of signals that is common to each terminal and transmitted to the terminal 20 located within the coverage area 50 of its own base station 10, and transmits the plurality of signals at the same timing (step S1). If transmission to the entire coverage area 50 is not completed (No in step S2), the base station 10 changes the direction of the beams formed by the antenna 14 under the control of the controller 11 (step S3), and returns to the processing of step S1 to continue the transmission processing. If transmission to the entire coverage area 50 is completed (Yes in step S2), the base station 10 ends the transmission processing under the control of the controller 11.

Figure 12:
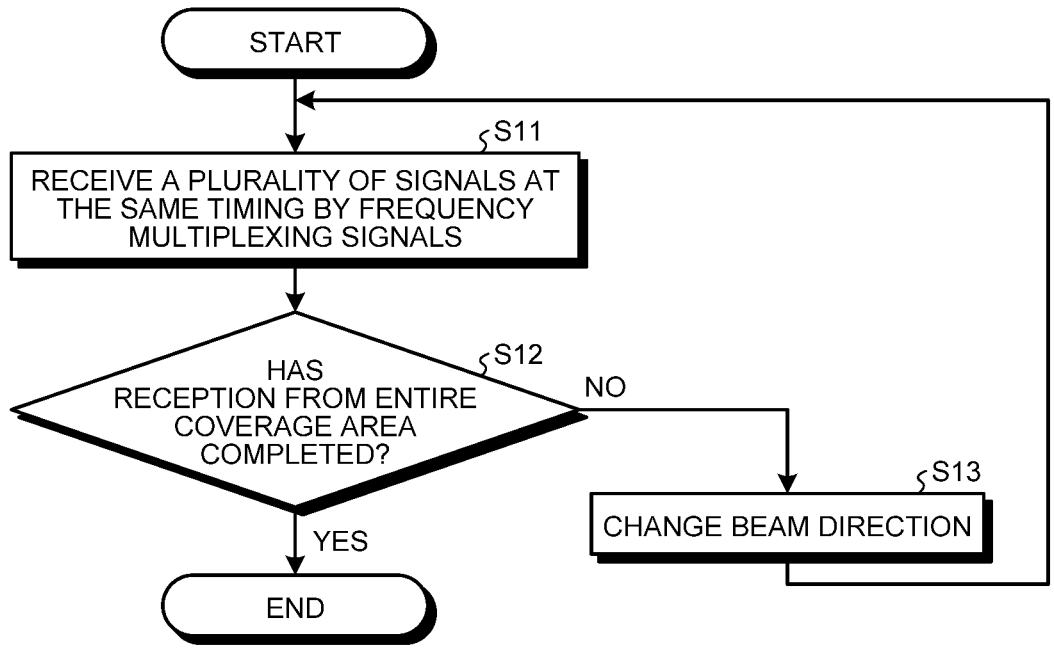
FIG. 12 is a flowchart illustrating processing in which the base station receives a signal from the terminal according to the first embodiment.

FIG. 12 is a flowchart illustrating processing in which the base station 10 receives signals from the terminal 20 according to the first embodiment. Under the control of the controller 11, the base station 10 performs frequency multiplexing on the frequency domain of a plurality of signals transmitted from a plurality of the terminals 20 located within the coverage area 50 of its own base station 10, and receives the plurality of signals at the same timing (step S11). If reception from the entire coverage area 50 is not completed (No in step S12), the base station 10 changes the direction of the beams formed by the antenna 14 under the control of the controller 11 (step S13), and returns to the processing of step S11 to continue the reception processing. If reception from the entire coverage area 50 is completed (Yes in step S12), the base station 10 ends the reception processing under the control of the controller 11.

Figure 13:
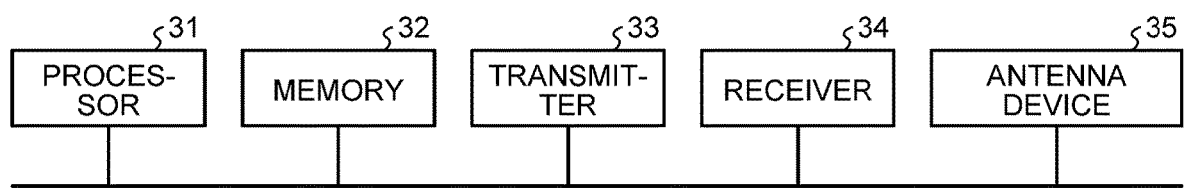
FIG. 13 is a diagram illustrating an example of the hardware configuration implementing the base station and the terminal according to the first embodiment.

Next, the hardware configuration of the base station 10 and the terminal 20 will be described. FIG. 13 is a diagram illustrating an example of the hardware configuration implementing the base station 10 and the terminal 20 according to the first embodiment. The base station 10 is implemented by, for example, a processor 31, a memory 32, a transmitter 33, a receiver 34, and an antenna device 35.

The processor 31 can be a central processing unit (CPU) or a system large scale integration (LSI), the CPU being also referred to as a central processor, a processing unit, an arithmetic unit, a microprocessor, a microcomputer, a processor, or a DSP.

The memory 32 can be a non-volatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disc, a mini disc, or a digital versatile disc (DVD).

The controller 11 and the modulator-demodulator 12 of the base station 10 are implemented by the processor 31 and programs stored in the memory 32. Specifically, the controller and the modulator-demodulator are implemented by the processor 31 reading, from the memory 32, the programs for performing the operation of each unit and executing the programs.

The transceiver 13 is implemented by the transmitter 33 and the receiver 34. That is, the transmission processing of the transceiver 13 is performed by the transmitter 33, and the reception processing of the transceiver 13 is performed by the receiver 34. The antenna 14 is implemented by the antenna device 35.

Figure 14:
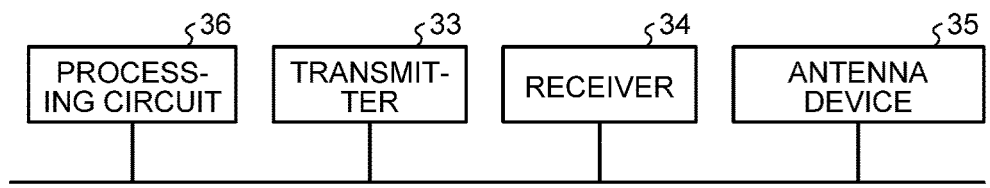
FIG. 14 is a diagram illustrating another example of the hardware configuration implementing the base station and the terminal according to the first embodiment.

FIG. 14 is a diagram illustrating another example of the hardware configuration implementing the base station 10 and the terminal 20 according to the first embodiment. The processor 31 and the memory 32 illustrated in FIG. 13 are replaced by a processing circuit 36. When implemented as dedicated hardware, the processing circuit 36 is a single circuit, a complex circuit, a programmed processor, a parallel-programmed processor, an application specific integrated circuit (ASIC), a field programmable gate array (FPGA), or a combination of those, for example. The functions of the controller 11 and the modulator-demodulator 12 of the base station 10 may be implemented function by function or may be implemented collectively by the processing circuit 36. Note that the functions of the controller 11 and the modulator-demodulator 12 of the base station 10 may be implemented partly by dedicated hardware and partly by software or firmware. The processing circuit can thus implement the aforementioned functions by dedicated hardware, software, firmware, or a combination of these.

Likewise, the controller 21 and the modulator-demodulator 22 of the terminal 20 illustrated in FIG. 10 are implemented by the processor 31 and programs stored in the memory 32. The controller and the modulator-demodulator are implemented by the processor 31 reading, from the memory 32, the programs for performing the operation of each unit and executing the programs. Alternatively, the controller 21 and the modulator-demodulator 22 are implemented by the processing circuit 36.

The transceiver 23 is implemented by the transmitter 33 and the receiver 34. That is, the transmission processing of the transceiver 23 is performed by the transmitter 33, and the reception processing of the transceiver 23 is performed by the receiver 34. The antenna 24 is implemented by the antenna device 35.

As described above, according to the present embodiment, the base station 10 transmits and receives a plurality of signals common to the terminals 20 located in the coverage area 50, specifically the SS, PBCH, SI, BRS, CSI-RS, and the like, at the same timing and synchronizes the timing for beam sweeping therewith, and also transmits and receives a plurality of signals transmitted from the terminals 20 located in the coverage area 50, specifically the PRACH, CSI, SR, SRS, and the like, at the same timing and synchronizes the timing for beam sweeping therewith. As a result, the base station 10 can efficiently use the frequency and time resources as compared with the case where the transmission/reception timings of the signals are set independently, and can thus secure more resources that can be used for data transmission/reception.

Second Embodiment

The first embodiment describes the case where the base station 10 periodically transmits the CSI-RS at the same timing as the SS, PBCH, SI, and BRS while frequency multiplexing the signals. However, when the channel quality fluctuates quickly over time, the base station 10 needs to decrease the transmission period of the CSI-RS, in which case the CSI-RS cannot be transmitted at the same timing as the SS, PBCH, SI, and BRS. A second embodiment describes a case where a dedicated format is defined separately for the CSI-RS transmitted periodically so that the base station 10 transmits the CSI-RS at a different timing from the SS and the like. Moreover, the CSI transmitted periodically by the terminal 20 in response to the CSI-RS is defined within the same frame format as the CSI-RS. Differences from the first embodiment will be described.

In the second embodiment, the configurations of the wireless communication system 100, the base station 10, and the terminal 20 are similar to those of the first embodiment.

Figure 15:
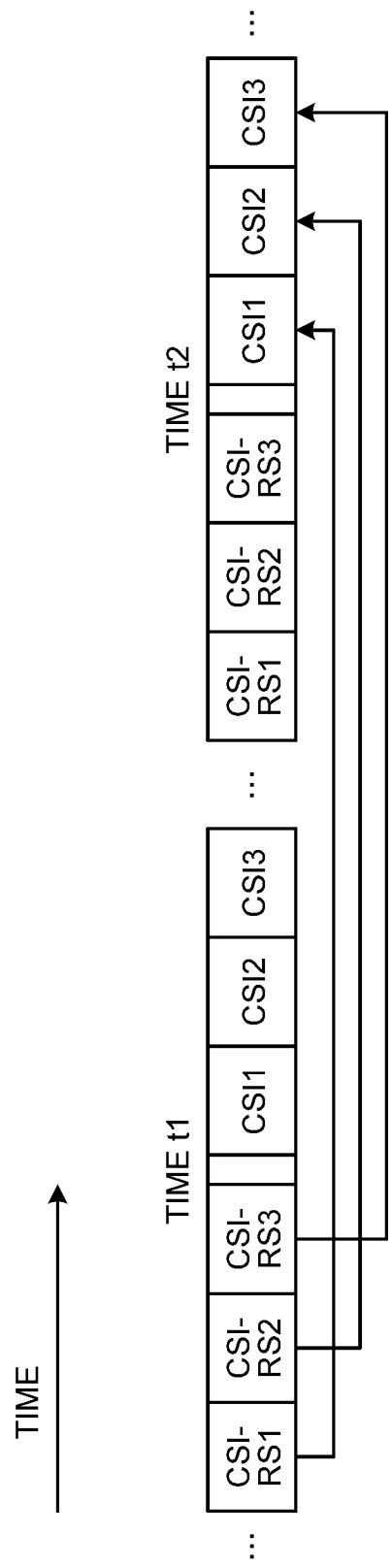
FIG. 15 is a diagram illustrating an example of a dedicated frame format for CSI-RS and CSI transmitted and received between the base station and the terminal according to a second embodiment.

FIG. 15 is a diagram illustrating an example of a dedicated frame format for the CSI-RS and CSI transmitted and received between the base station 10 and the terminal 20 according to the second embodiment. A CSI-RS1 is the CSI-RS transmitted from the base station 10 to the area defined by the first timing of beam sweeping in FIG. 5. Likewise, CSI-RS2 and CSI-RS3 are the CSI-RSs transmitted from the base station 10 to the areas defined by the second timing and the third timing of beam sweeping in FIG. 5, respectively. A CSI1 is the CSI transmitted by the terminal 20 located in the area defined by the first timing of beam sweeping in FIG. 5. Likewise, CSI2 and CSI3 are the CSIs transmitted by the terminal 20 located in the areas defined by the second timing and the third timing of beam sweeping in FIG. 5, respectively.

The wireless communication system 100 periodically arranges the dedicated frame format defining the CSI-RS and CSI. For example, the terminal 20 performing measurement of a CSI-RSx at time t1 reports a result of measurement using a CSIx at time t2. There can be a case where one terminal 20 performs measurement and makes reports on all the CSI-RS1 to the CSI-RS3, in which case the target terminal 20 may make a report at a preset report timing CSIx. The time to report can be set at time t1 coincident with time t1 at which the CSI-RSx to be measured is present, or can be set at time t2 at which the dedicated frame format for the CSI-RS and CSI one period later is present. Alternatively, the time to report can be set at time at which the dedicated frame format for the CSI-RS and CSI "K" periods after time t1, at which the CSI-RSx to be measured is present, is present. That is, in the wireless communication system 100, the period of arrangement of the dedicated frame format for the CSI-RS and CSI can be set independently of the length of time before each terminal 20 measures the CSI-RS and makes a report.

Figure 16:
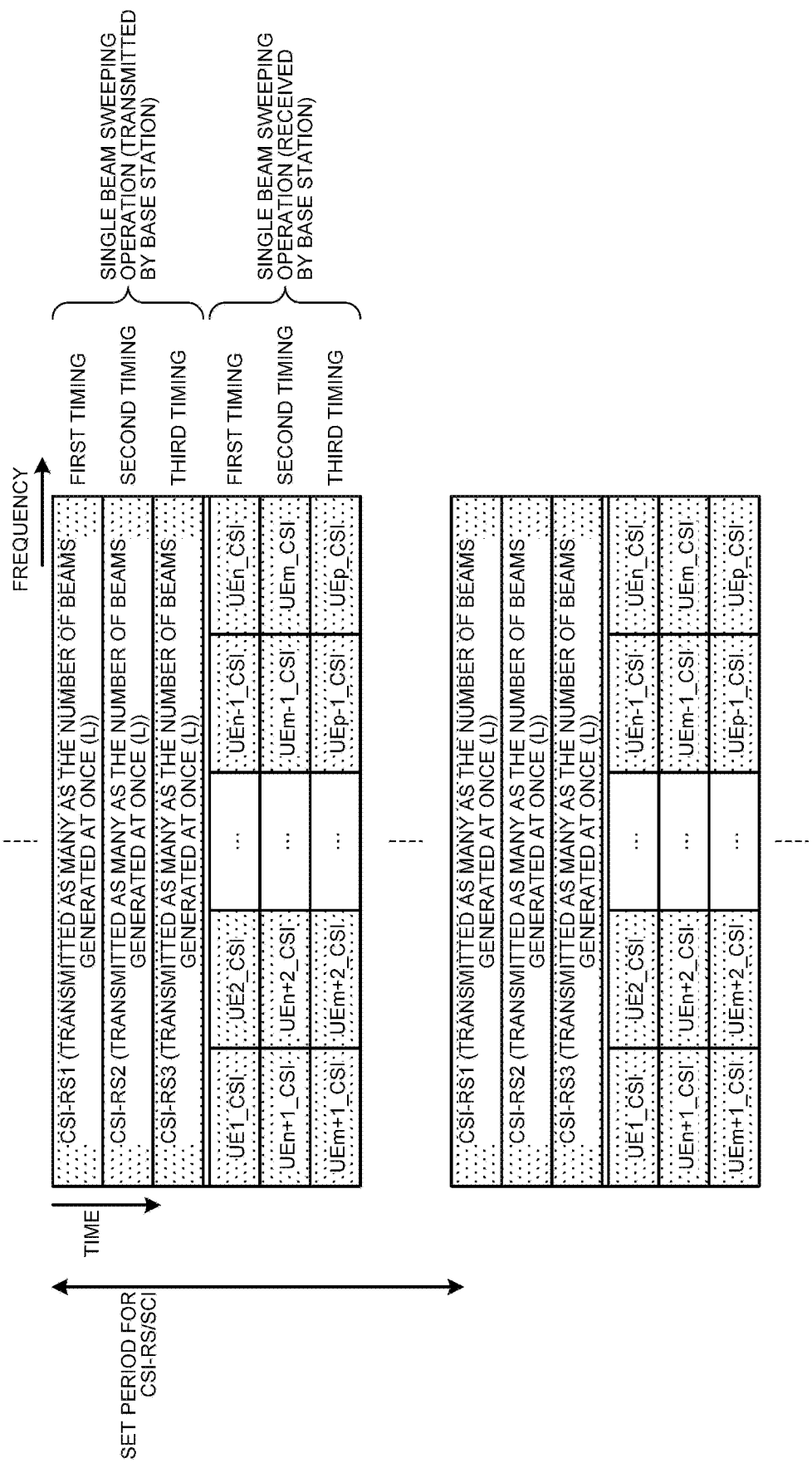
FIG. 16 is a diagram illustrating an example in which the dedicated frame format for the CSI-RS and CSI transmitted and received between the base station and the terminal is expressed on a frequency domain, according to the second embodiment.

FIG. 16 is a diagram illustrating an example in which the dedicated frame format for the CSI-RS and CSI transmitted and received between the base station 10 and the terminal 20 is expressed on the frequency domain, according to the second embodiment. The CSI-RSx is common to the terminals 20 located in the area defined by an x-th timing of beam sweeping or the terminals 20 in the entire coverage area 50. When the wireless communication system 100 is a broadband system, the circuit quality may vary in each frequency band so that the system allows the CSI-RS to be transmitted and received evenly across all the frequency bands. When the base station 10 can generate "L" beams at once, the CSI-RS may be transmitted using each of the L beams. On the other hand, the CSI is reported by each terminal 20 so that resources for a plurality of the terminals 20 reporting the CSI at the same timing are subjected to frequency multiplexing.

The functions of the above-described second embodiment can be achieved by adding the functions of the second embodiment to the controller 11 of the base station 10 and the controller 21 of the terminal 20. At the base station 10, the controller 11 passes a signal pattern of the CSI-RS to the modulator-demodulator 12 at the transmission/reception timing of the CSI-RS and CSI. The controller 11 instructs the antenna 14 about the transmission direction of each beam in beam sweeping. The controller 11 also instructs the antenna 14 about the reception direction of each beam in beam sweeping at the time of receiving the CSI. The controller 11 receives a signal from the modulator-demodulator 12 and accumulates information indicated by the CSI for use in selecting the modulation scheme and the error correction coding rate the next time data is transmitted to a target terminal 20.

At the terminal 20, the controller 21 issues an instruction to measure the CSI-RS to each of the antenna 24, the transceiver 23, and the modulator-demodulator 22 at the timing of measuring the CSI-RS. The controller 21 also converts a result of measurement into the CSI format, and passes a CSI signal to the modulator-demodulator 22 at the timing of transmitting the CSI.

Figure 17:
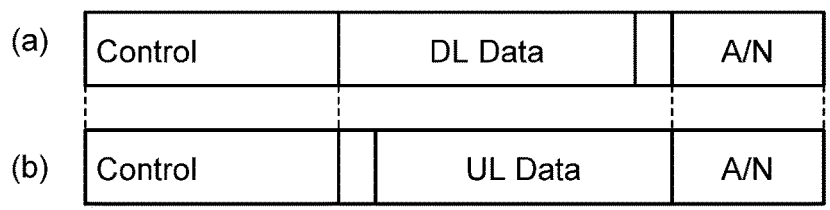
FIG. 17 is a diagram illustrating examples of frame formats under consideration by the 3GPP for use in the fifth generation mobile communication system.

Here, a description will be given of frame formats under consideration by the 3GPP for use in the fifth generation mobile communication system, as described in the problem to be solved by the invention above. FIG. 17 is a diagram illustrating examples of the frame formats under consideration by the 3GPP for use in the fifth generation mobile communication system. FIG. 17 (a) defines a control signal area at the top as indicated by "Control" which is related to a downlink or an uplink using a downlink, a data signal area in the middle as indicated by "DL Data" which uses a downlink, and an ACK/NACK signal notification area at the end as indicated by "A/N" for a downlink using an uplink. The ACK/NACK is a signal indicating whether or not a downlink data signal is received properly. FIG. 17 (b)

defines a control signal area at the top as indicated by "Control" which is related to a downlink or an uplink using a downlink, a data signal area in the middle as indicated by "UL Data" which uses an uplink, and an ACK/NACK signal notification area at the end as indicated by "A/N" for a downlink using an uplink. Blank areas illustrated in FIG. 17, specifically between "DL Data" and "A/N" and between "Control" and "UL Data", are sections called gaps. In a time division duplex (TDD) system handling the downlink and uplink using the same frequency, a blank period occurs before the base station 10 starts receiving a signal from the terminal 20 in the uplink after completely transmitting a signal in the downlink, considering the circuit configuration of the terminal 20 and a propagation delay of the radio signal between the base station 10 and the terminal 20. In view of this, the frame formats currently under consideration have the gap sections.

Assuming a case where the CSI-RS and CSI are added to the frame formats illustrated in FIG. 17, a frame format in which only the CSI-RS is added, a frame format in which only the CSI is added, and a frame format in which both the CSI-RS and CSI are added that are defined for each of the two types of frame formats illustrated in FIG. 17 causes an increase in the number of frame format so that the control becomes complicated. Thus, in the case where the CSI-RS and CSI are transmitted and received periodically, the dedicated format for the CSI-RS and CSI defined as in the second embodiment enables measurement of the CSI-RS and reporting of the CSI by just adding one frame format in addition to the frame formats illustrated in FIG. 17.

Accordingly, the controller 11 at the base station 10 performs control to transmit and receive the CSI-RS and CSI between its own base station 10 and the terminal 20 using the frame format defined exclusively for transmission and reception of the CSI-RS and CSI. The CSI-RS is a quality measurement signal and is transmitted from the base station 10. The CSI is a measurement result report and is a signal by which the terminal 20 reports a result of measurement to the base station 10 after measuring the reception quality of the CSI-RS received.

The controller 11 further performs control to use a second frame format at a later timing than a first frame format, in which the CSI-RS is transmitted to the terminal 20, and receive the CSI for the CSI-RS in the first frame format from the terminal 20. In the above example, the frame format at time t1 illustrated in FIG. 15 corresponds to the first frame format, and the frame format at time t2 corresponds to the second frame format.

At the terminal 20, the controller 21 performs control to transmit and receive the CSI-RS and CSI between the base station 10 and its own terminal 20 using the frame format defined exclusively for transmission and reception of the CSI-RS and CSI.

The controller 21 further performs control to use the second frame format at a later timing than the first frame format, in which the CSI-RS for its own terminal 20 is received, and transmit the CSI for the CSI-RS in the first frame format from its own terminal 20. In the above example, the frame format at time t1 illustrated in FIG. 15 corresponds to the first frame format, and the frame format at time t2 corresponds to the second frame format.

Figure 18:
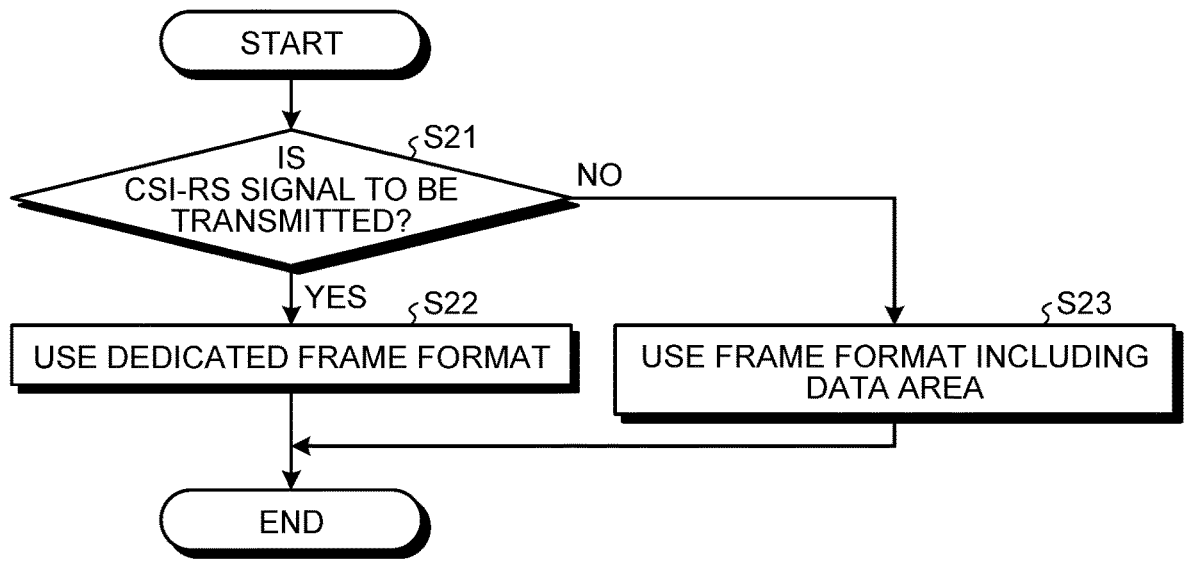
FIG. 18 is a flowchart illustrating processing in which the base station transmits a signal used for quality measurement to the terminal according to the second embodiment.

FIG. 18 is a flowchart illustrating processing in which the base station 10 transmits the signal used for quality measurement to the terminal 20 according to the second embodiment. At the base station 10, if a signal to be transmitted to the terminal 20 is the signal used for quality measurement, that is, the CSI-RS (Yes in step S21), the controller 11 uses the dedicated frame format (step S22). If a signal to be transmitted to the terminal 20 is a signal other than the signal used for quality measurement, that is, other than the CSI-RS (No in step S21), the controller 11 uses a frame format including a data area (step S23).

Figure 19:
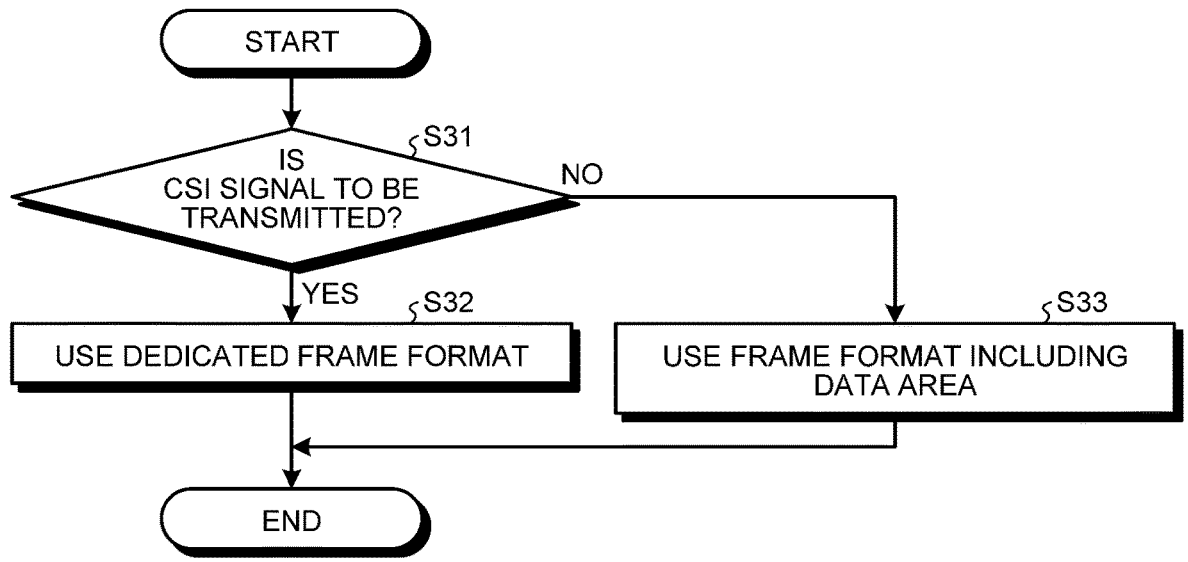
FIG. 19 is a flowchart illustrating processing in which the terminal transmits a signal of a measurement result report as a result of quality measurement to the base station according to the second embodiment.

FIG. 19 is a flowchart illustrating processing in which the terminal 20 transmits the signal of a measurement result report as a result of quality measurement to the base station 10 according to the second embodiment. At the terminal 20, if a signal to be transmitted to the base station 10 is the signal of a measurement result report, that is, the CSI (Yes in step S31), the controller 21 uses the dedicated frame format (step S32). If a signal to be transmitted to the base station 10 is other than the signal of a measurement result report, that is, other than the CSI (No in step S31), the controller 21 uses a frame format including a data area (step S33).

As described above, according to the present embodiment, the base station 10 and the terminal 20 use the dedicated frame format in periodically transmitting and receiving the CSI-RS and CSI. The base station 10 and the terminal 20 can thus transmit and receive the CSI-RS and CSI while efficiently using the frequency and time resources. In particular, the base station 10 uses the resources efficiently when transmitting and receiving the CSI-RS and CSI independently of the SS, PBCH, SI, and BRS for the reason that the transmission/reception period of the CSI-RS and CSI is shorter than the transmission/reception period of the SS, PBCH, SI, and BRS or the like. When the CSI-RS1, CSI-RS2, CSI-RS3, CSI1, CSI2, and CSI3 are put together in the same time period as in FIG. 15, one CSI-RS can be defined as the signal used for measurement by a plurality of the terminals 20 and at the same time the CSI can be frequency multiplexed, whereby the base station 10 need not waste the frequency resources as compared to when transmitting and receiving the CSI-RS and CSI to and from each of the plurality of terminals 20 individually. In addition, the base station 10 and the terminal 20 set the transmission/reception timings of the CSI-RS and CSI continuously to secure continuous time resources for data transmission and reception more easily as compared to when transmitting and receiving the CSI-RS and CSI at discontinuous timings, for example, thereby obtaining the effect of reduced control overhead without unnecessary occurrence of a plurality of control information units for data transmission and reception.

Third Embodiment

The second embodiment assumes that the base station 10 and the terminal 20 periodically perform the operation of transmitting and receiving the CSI-RS and CSI. However, the base station 10 and the terminal 20 can perform the operation of transmitting and receiving these signals not periodically but as needed. In such a case, it is preferable to use a format obtained by adding areas for the CSI-RS and CSI to the frame formats illustrated in FIG. 17 rather than using the dedicated frame format. A third embodiment describes the case where the operation of transmitting and receiving the CSI-RS and CSI is performed as needed. Differences from the first and second embodiments will be described. Note that FIG. 17 has already been described in the second embodiment.

In the third embodiment, the configurations of the wireless communication system 100, the base station 10, and the terminal 20 are similar to those of the first and second embodiments.

Figure 20:
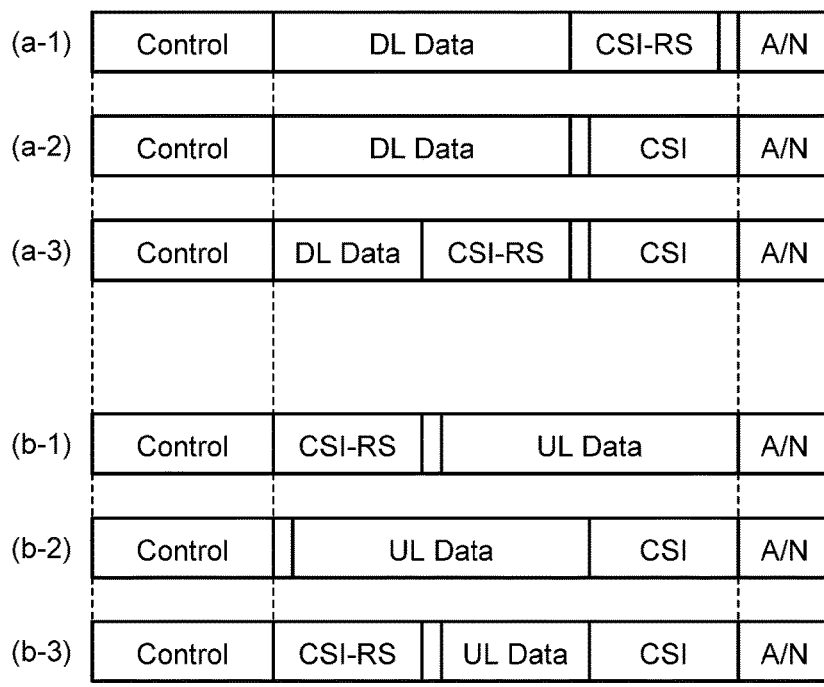
FIG. 20 is a diagram illustrating examples of frame formats used for transmission and reception of the CSI-RS and CSI between the base station and the terminal according to a third embodiment.

FIG. 20 is a diagram illustrating examples of frame formats used for transmission and reception of the CSI-RS and CSI between the base station 10 and the terminal 20 according to the third embodiment. The frame formats illustrated in FIG. 20 are based on the frame formats illustrated in FIG. 17 and obtained by adding thereto the areas for one or both of the CSI-RS and CSI. The frame format of FIG. 20 (a-1) is obtained by adding the area for only the CSI-RS to the frame format of FIG. 17 (a). The frame format of FIG. 20 (a-2) is obtained by adding the area for only the CSI to the frame format of FIG. 17 (a). The frame format of FIG. 20 (a-3) is obtained by adding the areas for the CSI-RS and CSI to the frame format of FIG. 17 (a). The frame format of FIG. 20 (b-1) is obtained by adding the area for only the CSI-RS to the frame format of FIG. 17 (b). The frame format of FIG. 20 (b-2) is obtained by adding the area for only the CSI to the frame format of FIG. 17 (b). The frame format of FIG. 20 (b-3) is obtained by adding the areas for the CSI-RS and CSI to the frame format of FIG. 17 (b).

When the frame format of FIG. 20 (a-1) or 20 (b-1) is used, the base station 10 issues a measurement instruction to the terminal 20 that needs to measure the CSI-RS in the "Control" area. At the same time, the base station 10 also specifies the timing to report the CSI. The terminal 20 uses the frame format illustrated in FIG. 20 (a-2), 20 (a-3), 20 (b-2), or 20 (b-3) at the report timing specified by the base station 10. The base station 10 may instruct the measurement of the CSI-RS and the timing to report the CSI to the terminal 20 not at the same time but independently. In this case as well, the terminal 20 can use the frame format illustrated in FIG. 20 (a-2), 20 (a-3), 20 (b-2), or 20 (b-3) in reporting the CSI. Moreover, the base station 10 can give the instruction to report the CSI in the "Control" areas within these frame formats.

The base station 10 can use the "Control" area as well when instructing the measurement of the CSI-RS using the frame format illustrated in FIG. 20 (a-3) or 20 (b-3). The base station 10 can instruct the timing to report the CSI and the measurement of the CSI-RS at the same time using the same "Control" area. Alternatively, the base station 10 may instruct the timing to report the CSI and the measurement of the CSI-RS to the terminal 20 not at the same time but independently. In either case, the terminal 20 can use the frame format illustrated in FIG. 20 (a-2), 20 (a-3), 20 (b-2), or 20 (b-3) in reporting the CSI, and the base station 10 can give the instruction to report the CSI in the "Control" area within any of these frame formats.

In the case where the data area, the CSI-RS area, and the CSI area are included in one frame format as illustrated in FIG. 20, the terminal 20 using the data area is different from the terminal 20 using the CSI-RS area or the CSI area, so that the terminal 20 using the data area needs to be informed of the presence of one or both of the CSI-RS area and the CSI area. This is because the data area has a different length as apparent from FIG. 20. Thus, for all the frame formats illustrated in FIG. 20, the base station 10 provides notification about the length of the data area to the terminal 20 that receives data using "DL Data" or the terminal 20 that transmits data using "UL Data". Alternatively, the base station 10 does not provide notification about the length of the data area when using the frame format without the CSI-RS area or the CSI area, and provides notification about the length of the data area only when using the frame format with the CSI-RS area or the CSI area. Yet alternatively, the base station 10 may notify the terminal 20 of an identification number for identifying the frame format illustrated in FIG. 20 instead of the length of the data area in the frame format. In this case, it is assumed that the base station 10 and the terminal 20 of the wireless communication system 100 know about the correspondence between the identification number of the frame format and the length of the data area in the frame format corresponding to the identification number.

The functions of the above-described third embodiment can be achieved by adding the functions of the third embodiment to the controller 11 of the base station 10 and the controller 21 of the terminal 20. When using the frame format including at least one of the CSI-RS area and the CSI area at the base station 10, the controller 11 includes the instructions to measure the CSI-RS and report the CSI for the terminal 20 measuring the CSI-RS as well as information on the resource positions of the CSI-RS and CSI in the control signal within the "Control" area, and passes the control signal to the modulator-demodulator 12. The controller 11 instructs the antenna 14 to direct the beams in the direction of the terminal 20.

When receiving the CSI from the terminal 20 at the base station 10, the controller 11 instructs the antenna 14 to direct the beams toward the terminal 20 that transmits the CSI. Moreover, the controller 11 includes the length of the data area or the information on the identification number of the frame format in the control signal within the "Control" area to be notified to the terminal 20 to which not the CSI-RS or CSI but data is transmitted or to the terminal 20 to which the data area in the uplink is allocated, thereby passing the control signal to the modulator-demodulator 12. The controller 11 instructs the antenna 14 to direct the beams in the direction of the terminal 20. The frame format illustrated in FIG. 20 having a reduced data area, the controller 11 instructs the antenna 14 to direct the beams toward the terminal 20 being a target of data transmission/reception only for the reduced time.

At the terminal 20 instructed to measure the CSI-RS in the "Control" area, the controller 21 instructs the modulator-demodulator 22, the transceiver 23, and the antenna 24 to perform signal measurement at the CSI-RS measurement timing. The controller 21 also converts a result of measurement into the frame format including the CSI area, and passes the result to the modulator-demodulator 22 at the timing of reporting the CSI.

At the terminal 20 determining that downlink data needs to be received by the instruction included in the "Control" area, the controller 21 instructs the modulator-demodulator 22, the transceiver 23, and the antenna 24 to acquire the information on the length of the data area and perform reception, demodulation, and decoding of the data with the length of the data area detected. At the terminal 20 to which the data area in the uplink is allocated by the instruction included in the "Control" area, the controller 21 acquires the information on the length of the data area and passes data, the amount of which corresponds to the length of the data area detected, to the modulator-demodulator 22.

As described above, a new frame format is created by additionally defining the CSI-RS area and the CSI area in the frame format having the data area. The base station 10 notifies a target terminal 20 of the frame format to be used or the information on the length of the data area. As a result, when only one or a small number of the terminals 20 requires transmission and reception of the CSI-RS and CSI, the base station 10 can instruct transmission and reception of the CSI-RS and CSI to a specific terminal 20 while at the same time perform data transmission and reception with another terminal 20 to be able to use the radio resources efficiently.

Thus, at the base station 10, the controller 11 performs control to transmit and receive the CSI-RS between its own base station 10 and the terminal 20 using the frame format that is obtained by defining the CSI-RS area or the CSI-RS area and the CSI area in the frame format having the data area, and transmit and receive the CSI between its own base station 10 and the terminal 20 using the frame format that is obtained by defining the CSI area or the CSI-RS area and the CSI area in the frame format having the data area. The controller 11 also performs control to include, in the control signal area of the frame format, the information on the frame format to be used including the frame format having the data area without the CSI-RS area and the CSI area, and notify the terminal 20 of the information.

The controller 11 further performs control to include, in the control signal area, the length of the data area or the information on the identification number of the frame format for identifying the frame format in use, and notify the terminal 20 using the data area of the information.

At the terminal 20, the controller 21 performs control to transmit and receive the CSI-RS between the base station 10 and its own terminal 20 using the frame format that is obtained by defining the CSI-RS area or the CSI-RS area and the CSI area in the frame format having the data area, and transmit and receive the CSI between the base station 10 and its own terminal 20 using the frame format that is obtained by defining the CSI area or the CSI-RS area and the CSI area in the frame format having the data area. Moreover, the controller 21 is notified of the information on the frame format to be used including the frame format having the data area without the CSI-RS area and the CSI area from the base station 10 through the control signal area within the frame format.

When its own terminal 20 uses the data area, the controller 21 is notified of the length of the data area or the information on the identification number of the frame format for identifying the frame format in use from the base station 10 through the control signal area.

Figure 21:
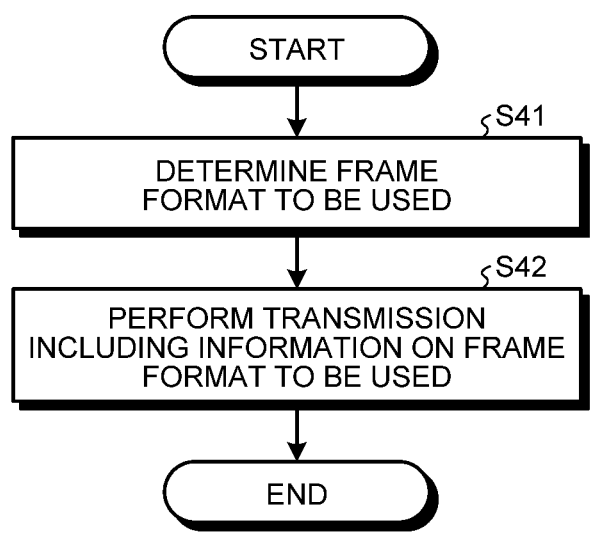
FIG. 21 is a flowchart illustrating processing in which the base station notifies the terminal of information on a frame format to be used, according to the third embodiment.

FIG. 21 is a flowchart illustrating processing in which the base station 10 notifies the terminal 20 of the information on the frame format to be used, according to the third embodiment. When transmitting any signal from the base station 10, the controller 11 determines to use either a frame format including at least one of the CSI-RS area and the CSI area in the data area or a frame format not including the CSI-RS area and the CSI area in the data area (step S41). The controller 11 performs control to include information on the frame format to be used in the control signal area, and transmit the signal to the terminal 20 using the frame format determined (step S42).

As described above, according to the present embodiment, the base station 10 and the terminal 20 not transmitting and receiving the CSI-RS and the CSI periodically do not use the dedicated frame format but use the frame format obtained by newly defining at least one of the CSI-RS area and the CSI area in the frame format having the data area. In the case where the CSI-RS and CSI are not transmitted and received periodically, all areas in the dedicated frame format as described in the second embodiment are not used, which is inefficient in terms of resource usage, whereas the frame format as described in the present embodiment allows the base station 10 and the terminal 20 to efficiently use the frequency and time resources without generating an unused area. Moreover, the base station 10 causes a change in the length of the data area by adding at least one of the CSI-RS area and the CSI area, thereby notifying the terminal 20 affected by the length of the data area of the length of the data area, the identification number of the frame format to be used, and the like. As a result, the base station 10 can transmit and receive data to and from the terminal 20 that needs to transmit and receive data in the frame format used for data transmission and reception without setting a wrong data length, and at the same time transmit or receive at least one of the CSI-RS and CSI to or from the terminal 20 that needs to transmit or receive at least one of the CSI-RS and CSI. Note that the present frame format periodically transmits and receives the CSI-RS and CSI but can also be used in a case where a small number of the terminals 20 are available for transmission and reception. In this case as well, a blank area is generated in the dedicated frame format described in the second embodiment but is not generated in the frame format described in the present embodiment.

Fourth Embodiment

In the third embodiment, the data area is decreased as the area for reporting the CSI is provided in the data area. A fourth embodiment describes a case where the CSI area is not added to the frame format having the data area but is defined at the same timing as the PRACH, that is, the PRACH and the CSI are transmitted at the same time.

In the fourth embodiment, the configurations of the wireless communication system 100, the base station 10, and the terminal 20 are similar to those of the first embodiment.

In the fourth embodiment, specifically, the base station 10 instructs the terminal 20 to measure the CSI-RS using only the frame formats illustrated in FIGS. 20 (*a*-1) and 20 (*b*-1). Upon receiving the measurement instruction, the terminal 20 makes a report using the CSI report resource, that is, the frequency and the time resources, of its own terminal 20 reserved in advance at any subsequent timing for transmitting the PRACH at which a result of measurement can be reported.

Figure 22:
FIG. 22 is a diagram illustrating an example when the terminal transmits a PRACH and signals used to report a CSI measurement result by multiplexing the signals in the frequency domain, according to a fourth embodiment.

FIG. 22 is a diagram illustrating an example when the terminal 20 transmits the PRACH and signals used to report the CSI measurement result by multiplexing the signals in the frequency domain, according to the fourth embodiment. The example of multiplexing the signals in the frequency domain as illustrated in FIG. 22 is similar to a case where all the SRs are replaced by CSIs in the example of multiplexing the signals in the frequency domain as illustrated in FIG. 7 in the first embodiment. Moreover, the example of multiplexing the signals in the frequency domain as illustrated in FIG. 22 is similar to a case where the time period corresponding to the transmission period of the SR is deleted in the example of multiplexing the signals in the frequency domain as illustrated in FIG. 8 in the first embodiment.

The functions of the above-described fourth embodiment can be achieved by adding the functions of the fourth embodiment to the controller 11 of the base station 10 and the controller 21 of the terminal 20. When using the frame format including the CSI-RS area at the base station 10, the controller 11 passes, to the modulator-demodulator 12, a signal of the frame format that includes, within the "Control" area, a control signal of the instruction to measure the CSI-RS and information on the resource position of the CSI-RS for the terminal 20 measuring the CSI-RS, and instructs the antenna 14 to direct the beams in the direction of the target terminal 20. When receiving the CSI from the target terminal 20 at the base station 10, the controller 11 determines the timing of beam sweeping at which the CSI report resource of the target terminal 20 is included at the timing of receiving the PRACH from the target terminal 20, and instructs the antenna 14 to direct the beams in the direction of the target terminal 20 at the timing determined. The operation between the base station 10 and the terminal 20 transmitting/receiving data to/from each other is similar to that in the third embodiment.

At the terminal 20 instructed to measure the CSI-RS in the "Control" area, the controller 21 instructs the modulator-demodulator 22, the transceiver 23, and the antenna 24 to perform signal measurement at the CSI-RS measurement timing. The controller 21 converts a result of measurement into the CSI format, and passes the CSI to the modulator-demodulator 22 at the timing of reporting the CSI which is coincident with the timing of transmitting the PRACH.

The operations of the terminal 20 determining that data needs to be received in the downlink in the "Control" area and the terminal 20 to which the data area in the uplink is allocated are similar to that of the third embodiment.

As described above, the CSI-RS is transmitted in the new format created by additionally defining the CSI-RS area in the frame format having the data area as with the third embodiment, whereas the CSI is transmitted together with the PRACH. The terminal 20 thus transmits the CSI by utilizing a surplus resource in the frequency domain at the timing of transmitting the PRACH, which is considered to occur periodically, thereby reducing waste of resources in the frequency domain. Transmission of the CSI together with the PRACH from the terminal 20 can avoid a case where transmission and reception of the CSI decrease the data area at the timing of data transmission and reception between the base station 10 and the terminal 20.

Thus, at the base station 10, the controller 11 performs control to transmit and receive the CSI-RS between its own base station 10 and the terminal 20 using the frame format that is obtained by defining the CSI-RS area in the frame format having the data area, and transmit and receive the CSI between its own base station 10 and the terminal 20 using the frame format that is obtained by defining the CSI area in the frame format used for the signal periodically transmitted from the terminal 20 to its own base station 10.

At the terminal 20, the controller 21 performs control to transmit and receive the CSI-RS between the base station 10 and its own terminal 20 using the frame format that is obtained by defining the CSI-RS area in the frame format having the data area, and transmit the CSI to the base station 10 using the frame format that is obtained by defining the CSI area in the frame format used for the signal periodically transmitted from its own terminal 20 to the base station 10.

Figure 23:
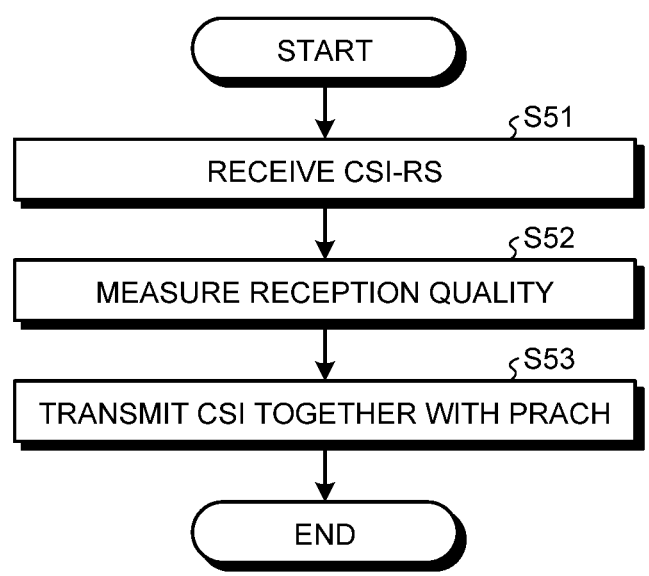
FIG. 23 is a flowchart illustrating processing in which the terminal transmits CSI to the base station according to the fourth embodiment.

FIG. 23 is a flowchart illustrating processing in which the terminal 20 transmits the CSI to the base station 10 according to the fourth embodiment. Upon receiving the CSI-RS from the base station 10 at the terminal 20 (step S51), the controller 21 measures the reception quality using the CSI-RS (step S52) and transmits the measured CSI to the base station 10 together with the PRACH (step S53).

As described above, according to the present embodiment, the base station 10 and the terminal 20 transmit and receive the CSI-RS using the frame format that is obtained by newly defining the CSI-RS area in the frame format having the data area as with the third embodiment, and transmit the CSI at the same timing as the PRACH using the frame format that is obtained by newly defining the CSI area in the frame format in which the PRACH is transmitted. As a result, the base station 10 and the terminal 20 can secure a larger data area in the frame format having the data area as compared with the third embodiment, and can efficiently transmit the CSI by transmitting it together with the PRACH that has space in the frequency band.

The configuration illustrated in the above embodiment merely illustrates an example of the content of the present invention, and can thus be combined with another known technique or partially omitted and/or modified without departing from the scope of the present invention.

REFERENCE SIGNS LIST

10 base station; 11, 21 controller; 12, 22 modulator-demodulator; 13, 23 transceiver; 14, 24 antenna; 20 terminal; 100 wireless communication system.

The invention claimed is:

1. A base station comprising:
a frequency multiplexing circuitry to perform frequency multiplexing a plurality of signals common to each terminal on a frequency domain;
a transmission controller to perform control to transmit at least one of signals among the plurality of signals while changing a transmission direction of the signals by using a beam; and
an antenna to transmit the signals according to the control of the transmission controller,
wherein when a transmission period of one or more first signals is longer than a transmission period of a second signal other than the first signal among the plurality of signals, the transmission controller performs control to transmit the plurality of signals while allowing the first signal to be transmitted at the same timing as the second signal, and
wherein the first signal is a system information signal, and the second signal is a physical broadcast channel signal.

2. The base station according to claim 1, wherein the transmission controller performs control to transmit and receive a quality measurement signal that is transmitted from its own base station and a measurement result report that is a signal reported to its own base station and indicating a result of measurement of reception quality of the quality measurement signal received by the mobile terminal, the controller performing control such that:
the quality measurement signal and the measurement result report are transmitted and received between its own base station and the mobile terminal by using a frame format that is defined exclusively for transmitting and receiving the quality measurement signal and the measurement result report.

3. The base station according to claim 2, wherein the transmission controller performs control to use a second frame format corresponding to a later timing than a first frame format in which the quality measurement signal is transmitted to the mobile terminal, and receive, from the mobile terminal, the measurement result report for the quality measurement signal transmitted in the first frame format.

4. The base station according to claim 1, wherein the transmission controller performs control to transmit and receive a quality measurement signal that is transmitted from its own base station and a measurement result report that is a signal reported to its own base station and indicating a result of measurement of reception quality of the quality measurement signal received by the mobile terminal, the transmission controller performing control such that:
the quality measurement signal is transmitted and received between its own base station and the mobile terminal using a frame format that is obtained by defining an area for the quality measurement signal or areas for the quality measurement signal and the measurement result report in a frame format having a data area; and the measurement result report is transmitted and received between its own base station and the mobile terminal using a frame format that is obtained by defining an area for the measurement result report or areas for the quality measurement signal and the measurement result report in a frame format having the data area, and the transmission controller performs control to include, in a control signal area within the frame format, information on a frame format to be used including a frame format that has the data area but does not have areas defined for the quality measurement signal and the measurement result report, and notify the mobile terminal of the information.

5. The base station according to claim 4, wherein the transmission controller performs control to include, in the control signal area, a length of the data area or information on an identification number of a frame format for identifying the frame format in use, and notify the mobile terminal using the data area of the information.

6. The base station according to claim 1, wherein the transmission controller performs control to transmit and receive a quality measurement signal that is transmitted from its own base station and a measurement result report that is a signal reported to its own base station and indicating a result of measurement of reception quality of the quality measurement signal received by the mobile terminal, the transmission controller performing control such that:

the quality measurement signal is transmitted and received between its own base station and the mobile terminal using a frame format that is obtained by defining an area for the quality measurement signal in a frame format having a data area; and the measurement result report is transmitted and received between its own base station and the mobile terminal using a frame format that is obtained by defining an area for the measurement result report in a frame format used for a signal periodically transmitted from the mobile terminal to its own base station.

7. A mobile terminal comprising:
a controller to perform control to receive a plurality of signals at the same timing by receiving a signal in which the plurality of signals is frequency-multiplexed on a frequency domain from the base station according to claim 1.

8. The mobile terminal according to claim 7, wherein
the controller performs control to transmit and receive a quality measurement signal that is transmitted from the base station and a measurement result report that is a signal reported to the base station and indicating a result of measurement of reception quality of the quality measurement signal received by its own mobile terminal, the controller performing control such that:
the quality measurement signal and the measurement result report are transmitted and received between the base station and its own mobile terminal by using a frame format that is defined exclusively for transmitting and receiving the quality measurement signal and the measurement result report.

9. The mobile terminal according to claim 8, wherein
the controller performs control to use a second frame format corresponding to a later timing than a first frame format in which the quality measurement signal for its own mobile terminal is received, and transmit, from its own mobile terminal, the measurement result report for the quality measurement signal received in the first frame format.

10. The mobile terminal according to claim 7, wherein the controller performs control to transmit and receive a quality measurement signal that is transmitted from the base station and a measurement result report that is a signal reported to the base station and indicating a result of measurement of reception quality of the quality measurement signal received by its own mobile terminal, the controller performing control such that:

the quality measurement signal is transmitted and received between the base station and its own mobile terminal using a frame format that is obtained by defining an area for the quality measurement signal or areas for the quality measurement signal and the measurement result report in a frame format having a data area; and the measurement result report is transmitted and received between the base station and its own mobile terminal using a frame format that is obtained by defining an area for the measurement result report or areas for the quality measurement signal and the measurement result report in a frame format having the data area, and the controller is notified, from the base station, of information on a frame format to be used including a frame format that has the data area but does not have areas defined for the quality measurement signal and the measurement result report through a control signal area within the frame format.

11. The mobile terminal according to claim 10, wherein when its own mobile terminal uses the data area, the controller is notified, from the base station, of a length of the data area or information on an identification number of a frame format for identifying the frame format in use through the control signal area.

12. The mobile terminal according to claim 7, wherein the controller performs control to transmit and receive a quality measurement signal that is transmitted from the base station and a measurement result report that is a signal reported to the base station and indicating a result of measurement of reception quality of the quality measurement signal received by its own terminator, the controller performing control such that:

the quality measurement signal is transmitted and received between the base station and its own mobile terminal using a frame format that is obtained by defining an area for the quality measurement signal in a frame format having a data area; and the measurement result report is transmitted to the base station using a frame format that is obtained by defining an area for the measurement result report in a frame format used for a signal periodically transmitted from its own mobile terminal to the base station.

13. A reception method in a mobile terminal comprising:
performing control, by a controller, to receive a plurality of signals at the same timing by receiving a signal in which the plurality of signals is frequency-multiplexed on a frequency domain from the base station according to claim 1.

14. The base station according to claim 1, wherein when a transmission period of two or more third signals is longer than a transmission period of a fourth signal other than the third signals among the plurality of signals, the transmission controller performs control to allocate the same frequency position as a transmission resource of its own base station and a reception resource of the terminal to the two or more third signals, and time multiplex the two or more third signals for transmission.

15. A transmission method in a base station comprising:
performing, by a frequency multiplexing circuitry, frequency multiplexing a plurality of signals common to each terminal on a frequency domain;
performing, by a transmission controller, control to transmit at least one of signals among the plurality of signals while changing a transmission direction of the signals by using a beam; and
transmitting, by an antenna, the signals according to the control of the transmission controller,
wherein the transmission method further comprising:
performing, by the transmission controller, when a transmission period of one or more first signals is longer than a transmission period of a second signal other than the first signal among the plurality of signals, control to transmit the plurality of signals while allowing the first signal to be transmitted at the same timing as the second signal, and
wherein the first signal is a system information signal, and the second signal is a physical broadcast channel signal.

* * * * *